United States Patent
Bartz et al.

(10) Patent No.: US 6,671,225 B2
(45) Date of Patent: Dec. 30, 2003

(54) CORRELATION SPEED SENSOR

(75) Inventors: James C. Bartz, Kailua, HI (US); Roger H. Tancrell, Wilmington, MA (US); Stephen G. Boucher, Amherst, NH (US)

(73) Assignee: Airmar Technology Corporation, Milford, NH (US)

( * ) Notice: Subject to any disclaimer, the term of this patent is extended or adjusted under 35 U.S.C. 154(b) by 0 days.

(21) Appl. No.: 10/166,581

(22) Filed: Jun. 7, 2002

(65) Prior Publication Data

US 2003/0053374 A1 Mar. 20, 2003

Related U.S. Application Data

(63) Continuation of application No. 09/540,844, filed on Mar. 31, 2000, now Pat. No. 6,426,918.
(60) Provisional application No. 60/149,491, filed on Aug. 18, 1999.

(51) Int. Cl.[7] .................................. G01S 15/58
(52) U.S. Cl. .............................. 367/89; 367/98
(58) Field of Search ....................... 367/89, 98

(56) References Cited

U.S. PATENT DOCUMENTS

| | | |
|---|---|---|
| 3,066,279 A | 11/1962 | Marks |
| 3,657,924 A | 4/1972 | Kirk |
| 3,818,425 A | 6/1974 | Peynaud et al. |
| 3,885,873 A | 5/1975 | Andermo |
| 3,991,398 A | 11/1976 | Andermo et al. |
| 4,017,823 A | 4/1977 | Cooke et al. |
| 4,041,293 A | 8/1977 | Kihlberg |
| 4,068,207 A | 1/1978 | Andermo et al. |
| 4,104,912 A | 8/1978 | Clavelloux et al. |
| 4,166,229 A | 8/1979 | DeReggi et al. |
| 4,264,788 A | 4/1981 | Keidel et al. |
| 4,604,542 A | 8/1986 | Thompson |
| 4,633,119 A | 12/1986 | Thompson |
| 4,685,093 A | 8/1987 | Gill |
| 4,837,750 A | 6/1989 | Saunders |
| 4,905,207 A | 2/1990 | Fellinger et al. |
| 4,918,672 A | 4/1990 | Iwabuchi et al. |
| 5,077,700 A | 12/1991 | Shaw et al. |
| 5,089,996 A | 2/1992 | Masreliez |
| 5,235,557 A | 8/1993 | Masreliez |
| 5,422,860 A * | 6/1995 | Bradley et al. ............... 367/89 |
| 5,581,515 A | 12/1996 | Masreliez |
| 5,838,635 A | 11/1998 | Masreliez |
| 6,426,918 B1 | 7/2002 | Bartz et al. |

FOREIGN PATENT DOCUMENTS

WO     WO 01/13129 A1    2/2001

OTHER PUBLICATIONS

XP–002243637, *Numerical Recipes in C: The Art of Scientific Computing*, Cambridge University Press, Ch. 3 pp. 105–108, Ch. 9 pp. 347–362 (1988–1992).
XP–002243638, "Appendix 1 Real Zeros of a Function", pp. 963–966.

\* cited by examiner

*Primary Examiner*—Daniel T Pihulic
(74) *Attorney, Agent, or Firm*—Hamilton, Brook, Smith & Reynolds, P.C.

(57) ABSTRACT

A relative speed of an object is determined by monitoring random reflective surfaces in water. The system includes a first and second transmitter-receiver pair for producing echo signals of a monitored region. The monitoring pair of transducers are preferably positioned along an axis of motion of the object such that sampled data from the first and second transmitter-receiver pair are substantially similar but shifted in time due to a separation of transducers. Echo signal data from the transducers are then used to generate a time difference correlation function that is used to determine a time difference between the first and second signals. Based on the time difference between the time-shifted echo signals, a speed of a vessel is determined.

38 Claims, 19 Drawing Sheets

$$DF(T) = AC_{S1}(T) + AC_{S2}(T) - 2CC_{S1S2}(T)$$

$$DF(T) = AC_{S1}(T) + AC_{S2}(T) - 2CC_{S1S2}(T)$$

CORRELATION SPEED SENSOR

RELATED APPLICATION

This application is a Continuation of U.S. application Ser. No. 09/540,844 now U.S. Pat. No. 6,426,918 filed Mar. 31, 2000 entitled "Correlation Speed Sensor," which itself claims the benefit of U.S. Provisional Application Serial No. 60/149,491 filed Aug. 18, 1999 entitled "Correlation Speed Sensor," the entire teachings of both of which are incorporated herein by reference.

BACKGROUND OF THE INVENTION

Speed sensors used in aquatic applications such as those used to determine the speed of a vessel moving through water have become more accurate at the cost of increased complexity. In the past, speed sensors of the paddle-wheel type were simple but are now outdated due to the fact that they are vulnerable to damage by debris in the water and often impart an undesirable drag on the boat, thus, impeding forward motion. More advanced speed sensors include sophisticated electronics coupled to ultrasonic transducer pairs spaced on a motion axis of a vessel to monitor a forward speed.

According to suggested ultrasonic speed detection methods, two spaced transducers are used to monitor regions beneath the bottom-side of a vessel. Ultrasonic signals from each transducer are emitted towards randomly located reflective particles from such objects as air bubbles present in the water, while corresponding reflected signals are sampled by each respective transducer. Since the monitoring transducers are located along an axis in line with the forward motion of the vessel, each transducer monitors a substantially similar set of randomly located reflective surfaces when the vessel has a forward motion. In other words, a first sensor detects the reflections from a set of randomly located particles, while a second sensor detects reflections off a substantially similar set of particles at a time shift based on the forward motion. Accordingly, a time difference associated with the two substantially matching but time-shifted signals can then be used in conjunction with transducer separation to determine vessel speed.

There are drawbacks associated with the aforementioned side-by-side ultrasonic transducer speed sensor. For example, significant signal processing power must typically be employed to accurately determine vessel speed since two entire sets of sampled data corresponding to the location of the vessel at a given instant in time must be analyzed to accurately determine the time difference between the two sampled reflection signals. This is a heavy price to pay for accurately determining speed of a vessel.

SUMMARY OF THE INVENTION

The present invention provides several novel improvements for reducing the complexity of processing and comparing signals. Generally, the signal processing improvements disclosed herein reduce the complexity of determining a time difference between two similar signals, including the processing platform upon which the algorithm runs. In one application of the invention, a simplified set of data samples are processed to derive vessel speed, without unduly compromising accuracy of the speed sensor.

The preferred embodiment of the present invention includes two receivers, each for respectively monitoring a first and second region. A first and second signal are generated from each respective receiver based upon the intensity of corresponding reflections in the first and second monitored regions. Using these signals as inputs, a compare circuit is then used to compare an intensity of a reflection signal with a respective running threshold signal, wherein results of the compare are stored in memory. Based on this stored data, a time difference is generated between the first and second reflection signal.

In a preferred embodiment, the compare circuit generates a single bit result, where a binary 1 is stored in a memory device when the intensity of a reflection signal is greater than a respective running threshold signal. Conversely, a binary 0 is recorded for a compare sample when the respective running threshold is greater than the intensity of the reflection signal.

As discussed, the running threshold is preferably an historical composite of the intensity of the reflection signal in a monitored region. The running threshold is preferably generated based on the running average of the respective reflection signal in a particular monitored layer, i.e., a range bin, plus an offset between about 5 and 20 dB. An offset of 12 dB is used in a preferred embodiment.

In one embodiment, the memory device for storing binary compare results is a pair of tapped shift registers, in which samples of each monitored region are periodically stored. Based on time-stamped data in the tapped shift register, a time difference between a first and second reflection signal is calculated.

The present invention relies on a unique combination of auto-correlation and cross-correlation functions to determine a time-difference between signals. For example, an auto-correlation function tracks the degree to which a signal over a period of time is similar to itself. Essentially, generating the auto-correlation function involves convolving a signal onto itself. The cross correlation function, on the other hand, compares the likeness of two different signals with respect to each other. A combination of the auto-correlation of each signal and cross-correlation between the two signals is used to generate a correlation function for calculating a time difference between the two reflection signals.

The correlation function is preferably based on a discrete version of the auto-correlation function of the first and second reflection signal less twice the cross correlation between the first and second signal. For example, the correlation function is generated based on data at discrete points in time. Preferably, the correlation function is generated incrementally over time based on data at logarithmically spaced points in the tapped shift registers.

In one embodiment, monitoring contiguous and adjacent square-shaped regions coupled with the method of "digitizing" a reflection signal, i.e., single bit storage of a compare result, substantially linearizes the correlation function. Hence, it is possible to calculate a time difference between the first and second reflection signal from the correlation function using linear mathematics. Either or both interpolation and extrapolation of points in the correlation function are used to determine a zero-crossing point corresponding with a time difference between the first and second signal. Mathematically, the zero-crossing corresponds to the time difference between two substantially similar reflection signals.

The shape of the monitored region for each transducer is ideally rectangular such as a square. To further optimize accuracy of the device and simplify the mathematics associated with the correlation function, the transducers are preferably positioned to monitor two non-overlapping and contiguous rectangular or square regions because such positioning contributes to the generation of a linear time correlation function.

In one embodiment, a predetermined single layer region suspending randomly located reflective surfaces is monitored to generate the time difference function. In a preferred embodiment, however, multiple layers at various depths are simultaneously monitored, where data is averaged to produce a more accurate time difference correlation function. Specifically, calculating speed based on echo signals at multiple depths results in more accurate readings because some layers may be void of reflective particles altogether. Typically, one of the layers monitored includes a layer 3 to 5 inches beneath, for example, a boat. In the preferred embodiment, a set of shift registers is provided for each monitored layer or range bin, while a processing system simultaneously generates a difference correlation function based on sample data at multiple layers.

One aspect of the present invention is to generate a correlation function based on a substantially reduced data set. For example, the single bit compare result data stored in the shift registers is used to generate a function for determining the time difference between signals. Although only a single bit is stored for a sample compare, each bit contains enough information about the corresponding reflection signal that an accurate time difference between signals can be determined based on processing data at selected tap points of the shift register following each sample. For example, 7 logarithmically spaced data taps on the shift registers provide enough information in a 65 bit wide shift register to generate an accurate correlation function.

Another aspect of the present invention is to incrementally generate a correlation function based on tapped data from a shift register such as 65 bits wide. Based on this topology, there is no need to accumulate and simultaneously process an exorbitant amount of data such as 16 bit A/D readings. Rather, the correlation function or equation used in the present invention is generated incrementally while only a reduced set of sample data is stored at any given time. For instance, a relatively small memory device provides sufficient storage space for data samples. Moreover, a relatively simple processing device is required to process such data.

These and other advantages of the present invention will be described in more detail throughout this specification.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

Figure 1:
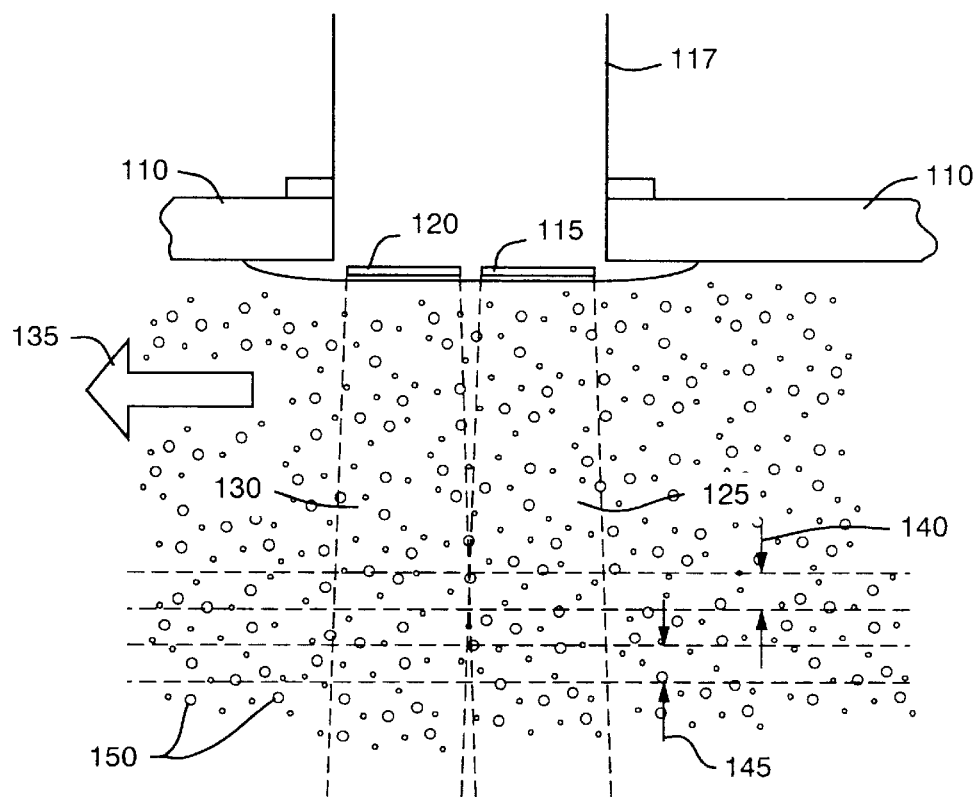
FIG. 1 is a schematic cross-section view of the present invention that illustrates the disposition of two sensors monitoring randomly located reflective particles in a medium to be monitored.

FIG. 1 shows a preferred embodiment of the present invention where a first ultrasonic transducer 120 and second ultrasonic transducer 115 are positioned on a motion axis (arrow 135) of a vessel 110, such as a boat hull, for detecting vessel speed. Random particles 150 located in water provide a reflective surface off which transmitted signals or ultrasonic pings from the first and second ultrasonic transducers 120, 115 respectively are reflected. Ultrasonic pings are typically transmitted from each respective transducer at the same time, while transducers are appropriately spaced to reduce cross-talk.

In addition to generating signals such as pings, first transducer 120 and second transducer 115 also detect respective reflections off the randomly located reflective particles 150. Preferably, the monitored region is a predetermined layer beneath the speed sensor 117 such as range bin 140 or 145. Reflective particles 150 in a respective monitored region typically include bubbles, plankton, seaweed or the like including stationary objects such as an ocean floor or rocks.

Preferably, range bin 140 is located 3 to 5" beneath vessel hull 110, and is about ¼ inch in thickness. A second range bin 145 is optionally monitored for echo signals in addition to the first range bin 140, thus providing more data for accurately calculating a time difference between signals.

Monitoring multiple range bins according to a preferred embodiment of the present invention results in the acquisition of an optimal pool of statistical samples upon which vessel speed calculations are based. For example, a particular range bin may be void of reflective particles altogether, making it difficult to generate an accurate time difference correlation function.

The spacing between the first and second range bin 140, 145 is typically a ½ inch and is optimized according to the application. Although only two range bins 140 and 145 are shown in FIG. 1, any reasonable number of range bins can be monitored for determining vessel speed.

Sampling within each range bin 140 is controlled by precise time-sampling of reflection signals for each respective transducer 120, 115 following an ultrasonic ping. For example, each transducer generates an ultrasonic beam 125, 130 that is directionally transmitted beneath vessel hull 110 as shown. The ultrasonic signals travel at a known speed through the medium in which randomly located particles 150 are suspended.

The reflections off the randomly located particles also travel at an ultrasonic speed back to the respective transducer 115, 120. Accordingly, each ultrasonic transducer 115, 120 is sampled at the appropriate time following a transmit signal to properly monitor a range bin 140 at a desired depth. The reflection signal at the given depth is then recorded for later determining vessel speed.

Figure 2:
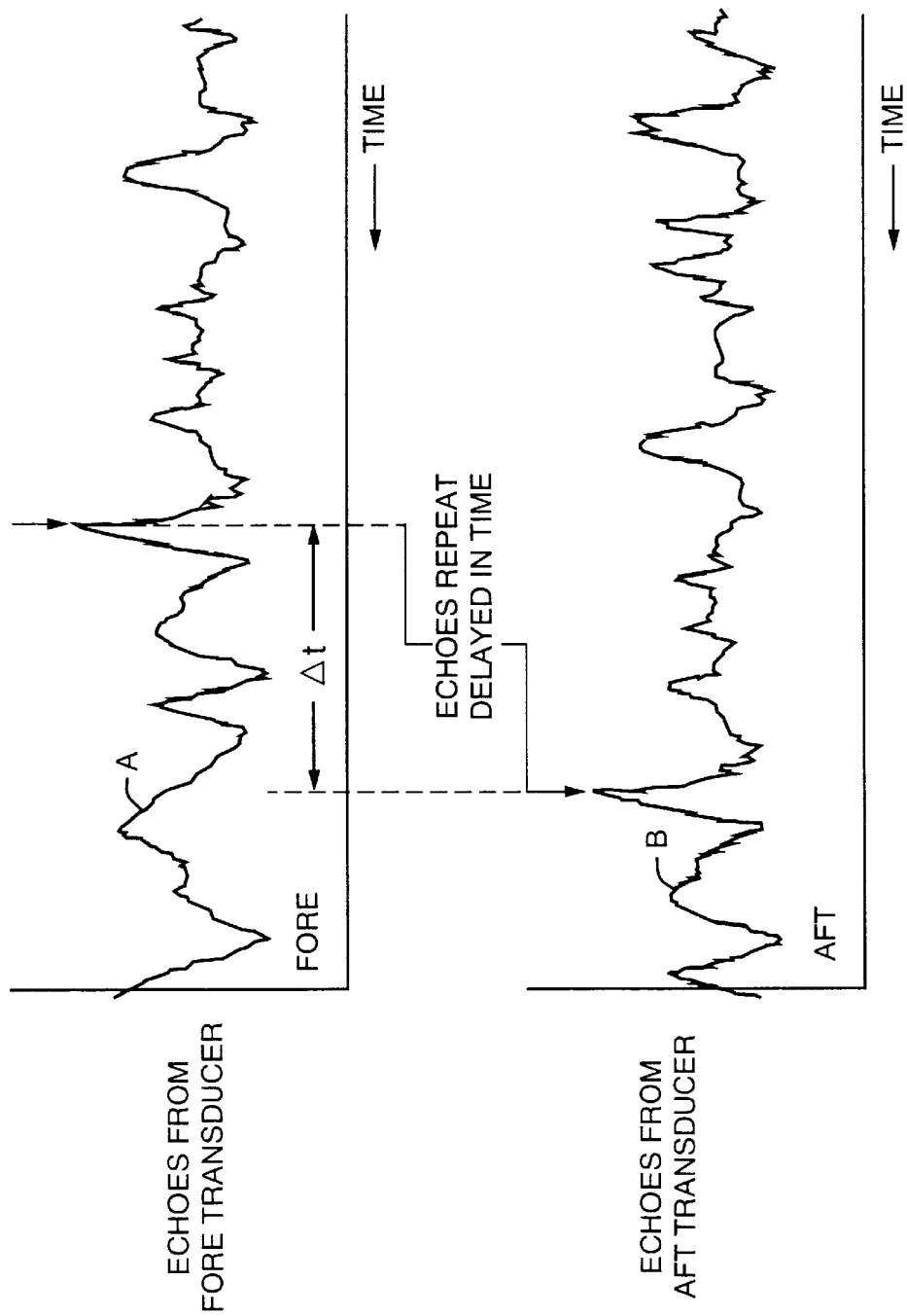
FIG. 2 is a plot of echo signal amplitude versus time of two similar but time-shifted reflection signals.

FIG. 2 shows an example of reflected echoes of a first and second transducer. For example, each ultrasonic transducer is coupled to electronic circuitry that generates a reflection signal indicative of the intensity of a reflection signal. A first echo signal A is compared to a second echo signal B to determine a delay time, $\Delta t$, between the similar but time-shifted reflection signals. Based on this time difference $\Delta t$ and the spacing $\Delta d$ between centers of the first and second transducer 120, 115 (FIG. 1), a vessel speed is generally calculated based on $\Delta d$ and $\Delta t$.

It should be noted that the shape of the signals in FIG. 2 is merely exemplary and that actual signals used in the present invention may vary depending on the application. More details regarding reflection signals and corresponding time difference or correlation functions is specifically described later in the specification.

Figure 3:
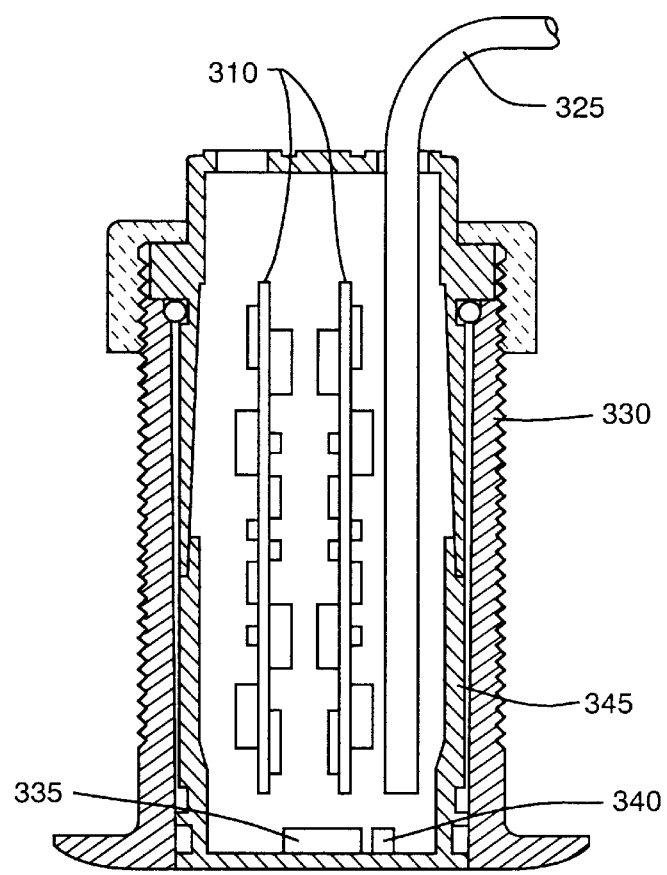
FIG. 3 is a side view of components in a speed sensor application of the present invention.

FIG. 3 illustrates a side view of the correlation sensor including housing 330 that is threaded for installation of the speed sensing device in bored vessel shells. Electronic circuitry resides on circuit board 310 for storing and processing data from first and second ultrasonic sensors located at 335. An interface cable 325 in communication with electronic circuitry 310 provides a medium in which speed calculations or other status information is communicated to other devices on board the vessel. For example, speed information is typically transmitted digitally via communication link 325 to a display monitor conveying the calculated speed of the vessel to the pilot.

Figure 4:
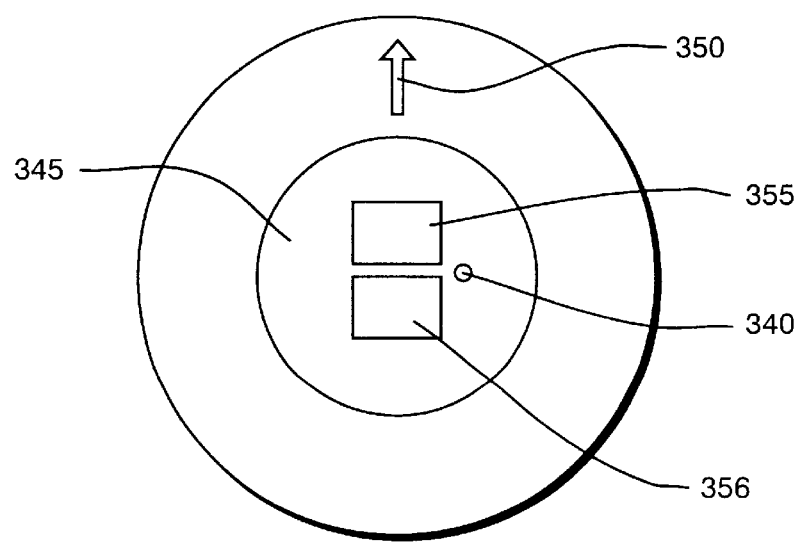
FIG. 4 is a top view of components in a speed sensor application of the present invention.

The bottom view of housing 330 in FIG. 4 illustrates a first and second transducer 355, 356 aligned approximately on an axis 350 of the forward motion of a vessel. Preferably, there is a small gap between transducers 355, 356 so that there is little or no cross-talk between them, i.e., each transducer should be substantially independent of the other to prevent interference of transmitted and received ultrasonic signals. This small gap may produce an error in the time difference correlation function, but it does so minimally affecting vessel speed calculations.

Based on a preferred positioning of sensors 355,356, the monitored first and second region lie directly beneath each sensor. While the vessel is moving in a forward direction, each transducer monitors a substantially same set of reflective particles but at different times. As mentioned, this time difference is ultimately used to calculate vessel speed when the vessel moves forward through a region of randomly located reflective surfaces 150 (FIG. 1) disposed in the beam path of the sensors 355, 356.

As shown in FIGS. 3 and 4, temperature sensor 340 provides a means for essentially detecting the temperature of fluid in communication with retractable insert 345 such as the temperature of water beneath a boat hull.

In the preferred embodiment, transducers 355,356 produce highly directional ultrasonic beams towards randomly located particles 150 in the analyzed medium such as water. A square shape (from top view) of each transducer renders it possible to more accurately monitor a square-shaped range bin. Accordingly, the square shape of the transducers contributes to linearize the time difference correlation function.

Spacing of monitored regions is also important. For example, it is preferred that adjacent monitored regions, in addition to being square-shaped, are contiguous on a common leg and are non-overlapping. Based on this orientation, the corresponding shape of the resulting time difference correlation function can be analyzed using linear mathematics.

Figure 5:
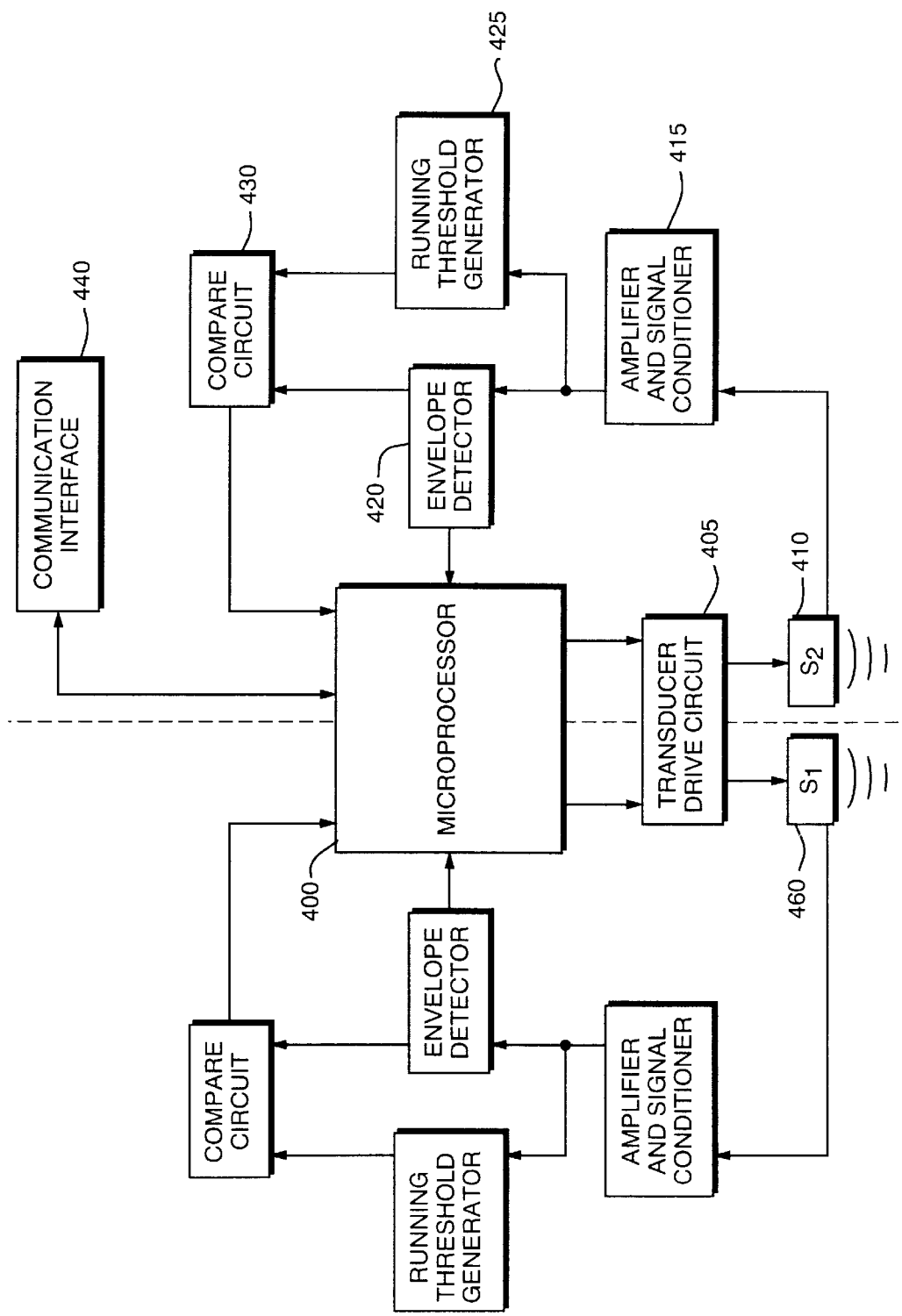
FIG. 5 is a block diagram of the electronics and related components in the present invention.

FIG. 5 is a block diagram of electronic circuitry and ultrasonic transducer elements. A first transducer 410 and second transducer 460 are driven by transducer drive circuit 405. In the preferred embodiment, the transducers 410 and 460 produce ultrasonic pings at a rate of 5.7 KHz, where each ping is 18 consecutive cycles at 4.5 MHz. Typically, each transducer 410, 460 is driven so that both transducers 410, 460 emit a ping at the same time.

In addition to transmitting ultrasonic signals, each transducer 410, 460 acts as an ultrasonic sensor or receiver. Amplifier and signal conditioner circuitry 415 provides high gain to electronically amplify the reflection signal since it is typically a relatively small signal. The reflection signal output of the amplifier and signal conditioner 415 is typically sinusoidal or an AC-like signal of varying amplitude, similar to an amplitude modulated radio signal. This amplified reflection signal is thereafter fed into envelope detector 420 and running threshold generator 425.

Envelope detector 420 is used to detect the envelope or signal intensity of the amplified reflection signal. The output of the envelope detector 420 is a signal proportional to the intensity of the reflection signal and is fed into compare logic 430.

The running threshold generator 425, as its name suggests, generates a reference voltage corresponding to a running average of each respective reflection signal. Preferably, the running threshold includes an offset proportional to the signal itself such as between 5 and 20 dB. However, a fixed offset is optionally used to generate the running threshold. The output of the running threshold generator 425 is a running threshold signal embodied as a reference voltage. This reference voltage is also fed into compare logic circuitry 430.

In the preferred embodiment, the running average of a respective reflection or echo signal is tracked only during the time that a range bin 140,145 (FIG. 1) is sampled. This is due to the fact that echoes outside of these bins may be drastically higher or lower than reflection signal levels detected within a range bin. For example, immediately following an ultrasonic ping, there is typically a very intense reflection due to disturbance of water in communication with the hull of the moving vessel. If this portion of the reflection signal were included in the running threshold, the result would naturally be higher, degrading the effectiveness of the comparison between a running threshold and instantaneous reflection signal intensity. In short, more accurate results are obtained when the running threshold is generated based on signals within a monitored range bin.

Tracking the running average of a reflection signal at a particular depth is achieved using a switch to control analog circuit generating the running threshold voltage. When a range bin is sampled, the switch is activated so that the running average and, therefore, running threshold is updated accordingly. Conversely, the switch is deactivated during non-sample time periods so that the running threshold value is maintained until the next sample period. In this way, each respective running threshold is proportional to echoes or reflections of particles in the desired range bins.

Preferably, the running threshold is an analog voltage based upon an RC circuit with a time constant of approximately one millisecond. This is approximately a magnitude slower than the sample rate of 5.7 KHz. Hence, the running threshold is comparably slow-changing with respect to changes in the intensity of the echo signal itself.

Compare logic circuitry 430 provides hardware for comparing running threshold voltage to the intensity of the reflection signal. As mentioned, a sample compare is precisely timed following an ultrasonic ping to monitor a range bin 140 (FIG. 1) at a predetermined depth.

Within each range bin, several compare samples are generated. For example, a reflection intensity signal from envelope detector 420 output is compared to a running threshold at four to five times per range bin. In other words, each range bin is preferably sampled at 4 or 5 different sub-layers for the detection of reflective particles. Again, a sample must be timed appropriately following a ping to monitor a desired range bin and sub-layers.

If sampling within a range bin results in a reflection signal greater than the running threshold, a logic 1 is recorded for the range bin sample. Conversely, a logic 0 is recorded for the range bin sample if all of the reflection signal samples in a range bin are less than the running threshold reference signal.

In a preferred embodiment, as mentioned, the running threshold is 12 dB above the running average of a respective echo signal. As a result, a logic one is not recorded for a sample within a range bin unless the intensity of the reflection signal is relatively strong. Based on adjusting the offset of the running threshold, it is possible to discriminate between larger and smaller reflective particles. For example, when the offset in the running threshold is set high, only relatively high intensity reflections corresponding to ultrasonic reflections off larger particles are recorded as a logic 1.

Microprocessor 400 typically includes ample memory for storage of sample data. Moreover, it also includes the algorithm for processing sampled data stored in memory. Although block 400 is labeled as a microprocessor, different functional packaging can be achieved using alternative electronic components.

Communication interface 440 coupled to microprocessor 400 provides a way to transmit and receive data to remote devices. For example, communication interface 440 supports serial communication of data such as calculated speed to a display for viewing.

It should be noted that although the blocks shown in FIG. 5 provide details of components and associated interconnections, packaging of electronics is not necessarily as important as the functional nature of the circuitry itself.

There are known substitutes for each of the blocks and described components. For example, microprocessor or micro-controller 400 optionally includes external memory devices such as RAM or FIFOs.

Figure 6:
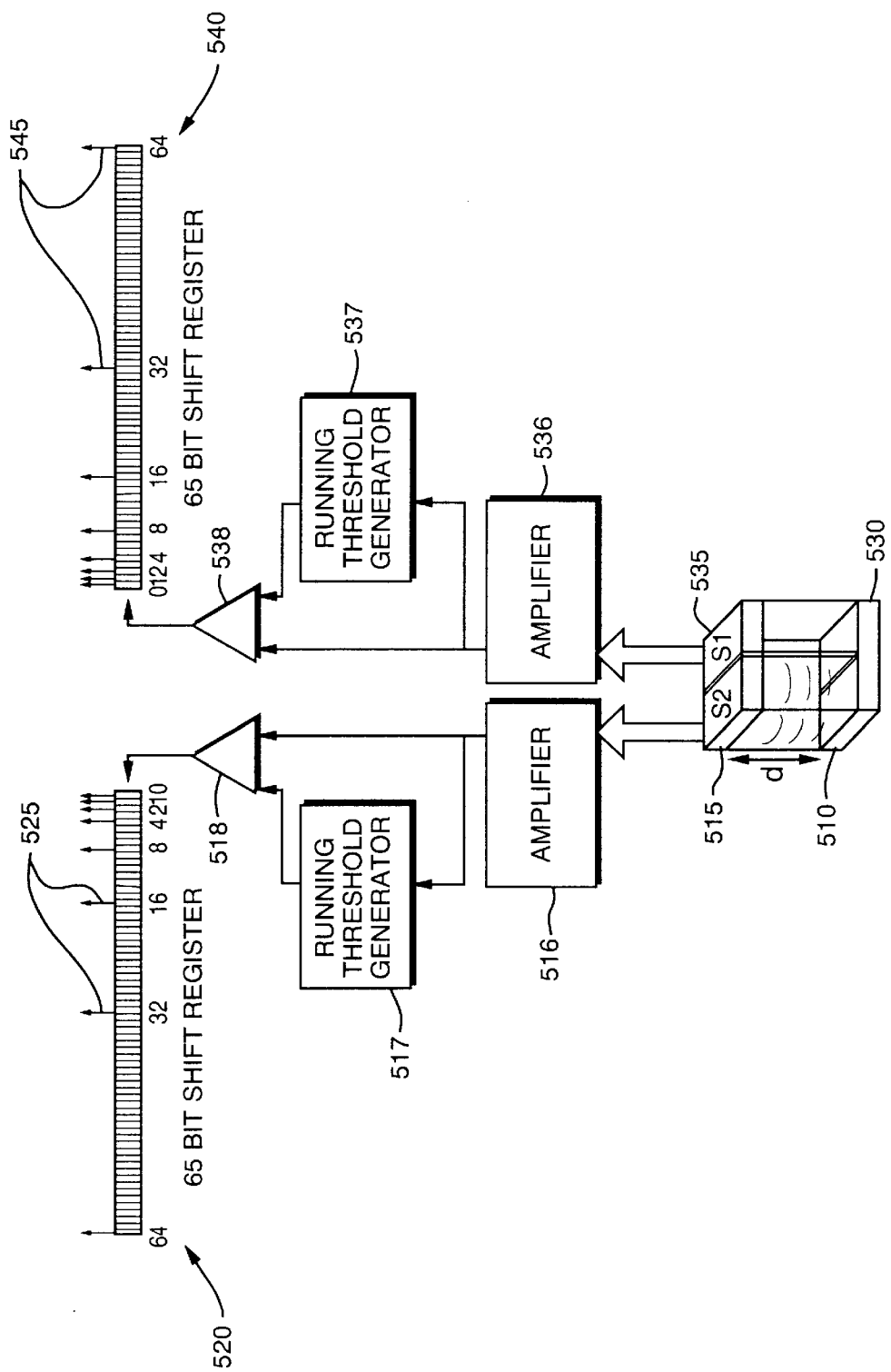
FIG. 6 is a block diagram of the present invention that illustrates further details of how each reflection signal is processed, where results are compared and stored in a tapped shift register.

FIG. 6 illustrates how sample data from sensors or transducers 515, 535 is processed and then stored in memory for the generation of a correlation function, which is described in more detail later in this specification.

The first transducer 515 and second transducer 535 transmit ultrasonic pings toward respectively monitored range bins 510 and 530. Preferably, the ping rate is fixed at 5.7 KHz, which transmits an 18 cycle long acoustic wave at a frequency of 4.5 MHz. It should be noted that transducer spacing and ping rate are optionally adjusted for the range of speeds detected in the application. Likewise, the running threshold level for compare purposes can be adjusted to detect relatively larger or smaller particles as mentioned.

A low level transducer reflection signal from transducers 515,535 is fed into the respective amplifier 516,536 as shown in FIG. 6. The output of the amplifier 516,536 is then fed into respective compare circuitry 518,538 and running threshold generator 517,537. Each running threshold generator then produces a running threshold reference voltage which is used for compare purposes. For example, the amplified reflection signal is compared to the running threshold using compare circuitry 518,538, where results are thereafter stored in shift registers (FIFOs) 520,540. As mentioned, a sample compare is timed appropriately following each ultrasonic ping issued at a rate of 5.7 KHz.

Sample compare results are preferably stored as single bit results in each respective FIFO 520,540, where data is shifted for storage of each new sample. Since the FIFO 520,545 is 65 bits wide, data in the last register is lost as each new sample compare data is stored in FIFO 520,540.

As shown, the tapped elements 525, 545 in the FIFOs 520,540 are logarithmically spaced. Following storage of a sample compare data in the respective FIFO, the sample data in tapped elements is then used to generate an optimal correlation function for essentially determining the time difference between the first and second reflection signals.

Figure 7:
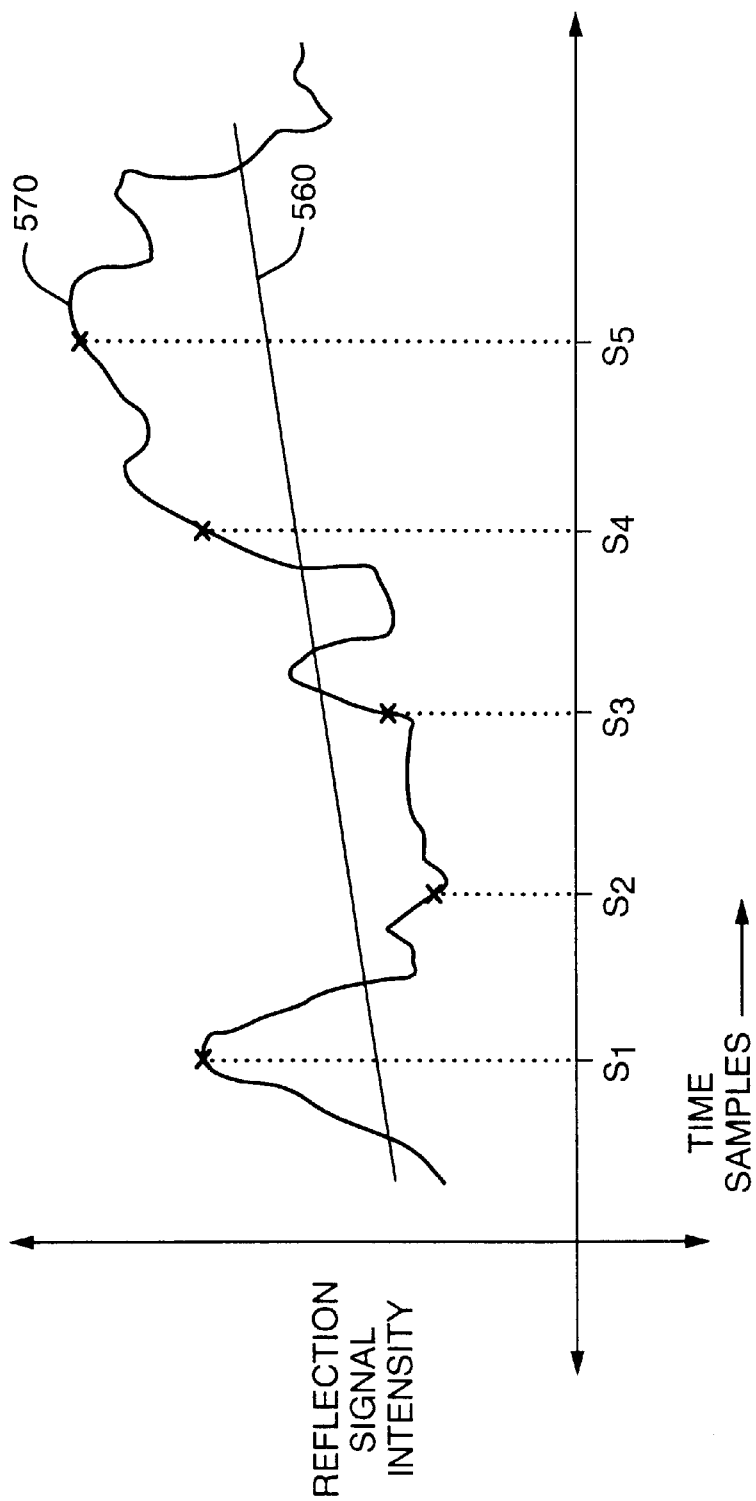
FIG. 7 is an illustration of a sample reflection signal and associated running threshold signal, which are compared to generate a single bit result that is stored in the tapped shift register of the present invention.

FIG. 7 is a graph showing an intensity of an echo or reflection signal 570 and corresponding running threshold 560. Accordingly, a sample of the reflection signal 570 at time $S_1$ is compared to running threshold 560. If the echo or reflection signal 570 of a sampled transducer is less than the corresponding running threshold 560, a logic 0 is recorded for that sample compare. Conversely, a logic 1 is recorded for a sample compare when the sample of the echo or reflection signal 570 is greater than the corresponding running threshold 560. Hence, for sample $S_1$, a logic 1 would be stored in the shift register (FIFOs) 520,540 (FIG. 6). Likewise, for sample $S_2$ a logic 0 would be stored in the shift register (FIFOs) 520,540 (FIG. 6) because the running threshold 570 is greater than intensity of the reflection signal at the sample time. The following table summarizes compare results for the graph shown in FIG. 7.

| Sample | Binary Compare Result |
|---|---|
| S1 | 1 |
| S2 | 0 |
| S3 | 0 |

-continued

| Sample | Binary Compare Result |
|--------|----------------------|
| S4 | 1 |
| S5 | 1 |

In a preferred embodiment, however, each range bin is preferably sampled 4 or 5 times and a logic 1 is recorded if any of the samples in a particular range bin 140 (FIG. 1) is greater than the running threshold 560. Hence, if sample S1 through S4 correspond with 4 samples taken at different depths within a range bin, a logic 1 would be stored in the shift register because at least one of the samples within the range bin was greater than the running threshold 560.

In the preferred embodiment, the time difference correlation function used to accurately determine the time difference value for calculating vessel speed is generated from the digitized sample data stored in FIFOs 520,540 (FIG. 6) for each respective reflection signal. Specifically, an auto-correlation function is generated for each respective sample log while a cross-correlation function is generated based on data from both the first and second reflection signal.

The auto-correlation function for this system can be written as:

$$AC_{S1}(\lambda) = \int_{-\infty}^{+\infty} S1(t) \times S1(t+\lambda) dt$$

$$AC_{S2}(\lambda) = \int_{-\infty}^{+\infty} S2(t) \times S2(t+\lambda) dt$$

while the cross-correlation function can be written as:

$$CC_{S1S2}(\lambda) = \int_{-\infty}^{+\infty} S1(t) \times S2(t+\lambda) dt$$

Figure 8:
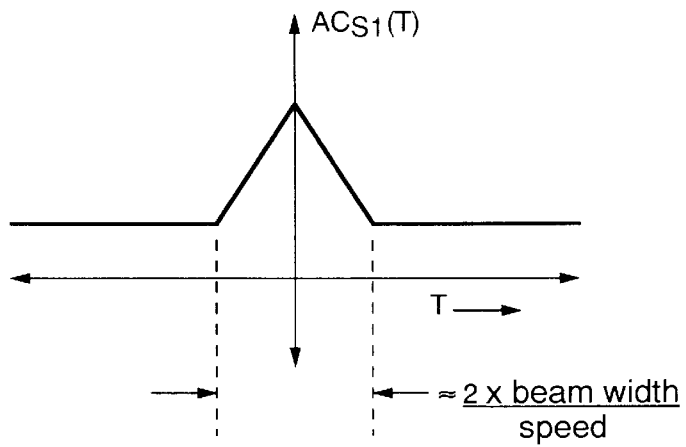
FIG. 8 is a graph of an auto-correlation signal of the first reflection signal.
Figure 9:
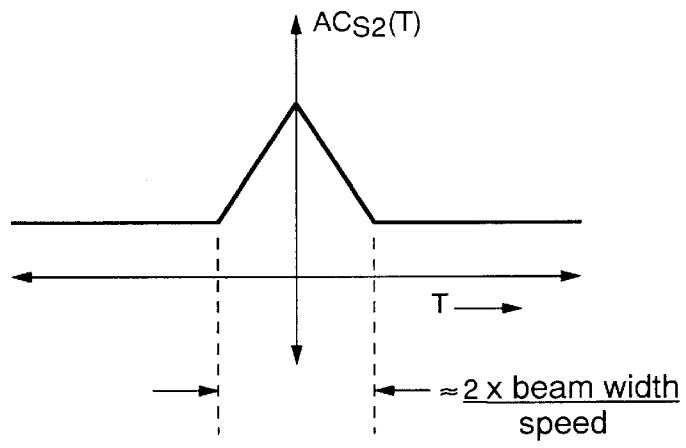
FIG. 9 is a graph of an auto-correlation signal of the second reflection signal.
Figure 10:
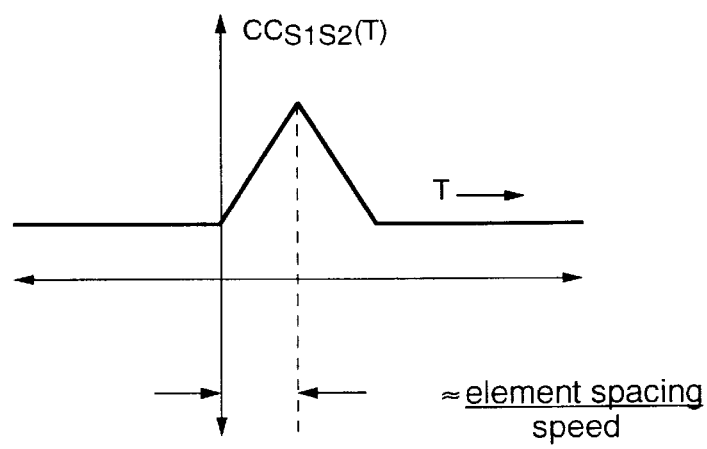
FIG. 10 is a graph of a cross-correlation function based on the first and second reflection signal.

In discrete form, the expressions are further reduced to produce auto and cross correlation functions as follows:

$$AC_{S1}(T) = \sum_{n=0}^{N-1} S1(n) \times S1(n+T)$$

$$AC_{S2}(T) = \sum_{n=0}^{N-1} S2(n) \times S2(n+T)$$

and $$CC_{S1S2}(T) = \sum_{n=0}^{N-1} S1(n) \times S2(n+T)$$

where N equals the number of discrete samples in a sample pool, i.e., 2850 consecutive samples at a rate of 5.7 KHz, T is the sample period or ping rate and n is a present discrete sample. A first and second auto-correlation function are shown in FIGS. 8 and 9 respectively. Likewise, an example of the cross-correlation function is illustrated in FIG. 10.

The shape of the correlation function of the present invention is substantially linear due to the shape of the transducers and monitored range bin, which is preferably rectangular. In the preferred embodiment, both square-shaped transducers are positioned in close proximity such that the rectangular areas monitored (top view) by each transducer or sensor are contiguous on a common side of the rectangular area. In other words, the monitored region from a top view appears as two non-overlapping squares touching on a common leg or side.

The aforementioned method of digitizing the data also contributes to linearize the time difference function supporting simplified mathematical calculations. Although a linear time difference correlation function is preferred, it is also possible to use non-linear time difference correlation functions to calculate speed based upon the methods recited herein.

The difference correlation function is derived from the addition of the auto-correlation function for each sample log less twice the cross-correlation function. In mathematical terms, the equation is as follows:

$$DF(T) = AC_{S1}(T) + AC_{S2}(T) - 2CC_{S1S2}(T)$$

In discrete terms the equation is:

$$DF(T) = \sum_{n=1}^{N} [(S1(n) \times S1(n+T)) + (S2(n) \times S2(n+T)) - 2(S1(n) \times S2(n+T))]$$

Figure 11:
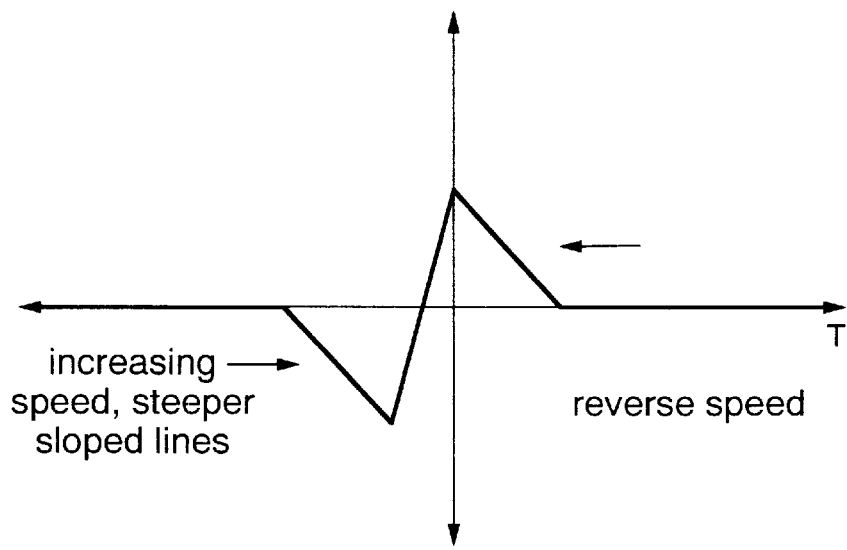
FIG. 11 is a graph of a reverse speed correlation function according to the equations of the present invention.
Figure 12:
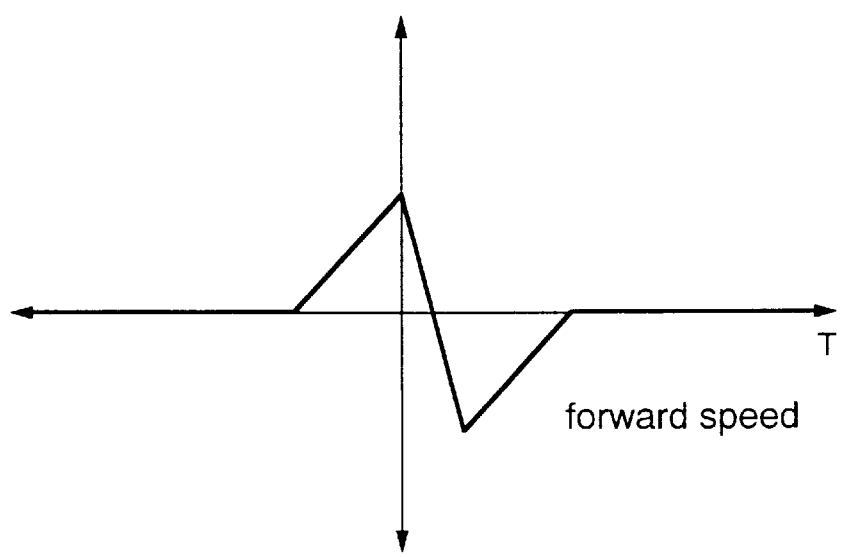
FIG. 12 is a graph of a forward speed correlation function according to the equations of the present invention.

FIGS. 11 and 12 graphically depict the difference correlation function for a reverse and forward speed respectively. For higher speeds, the slopes of the lines becomes steeper. Conversely, slower vessel speeds result in flatter peaks and valleys on the difference correlation function.

The difference correlation function is preferably evaluated at several well chosen points as follows:

$$DF(T_1) = \sum_{i=1}^{2850} S1_0(t_i)S1_1(t_i) + S2_0(t_i)S2_1(t_i) - 2S1_0(t_i)S2_1(t_i)$$

$$DF(T_2) = \sum_{i=1}^{2850} S1_0(t_i)S1_2(t_i) + S2_0(t_i)S2_2(t_i) - 2S1_0(t_i)S2_2(t_i)$$

$$DF(T_4) = \sum_{i=1}^{2850} S1_0(t_i)S1_4(t_i) + S2_0(t_i)S2_4(t_i) - 2S1_0(t_i)S2_4(t_i)$$

$$DF(T_8) = \sum_{i=1}^{2850} S1_0(t_i)S1_8(t_i) + S2_0(t_i)S2_8(t_i) - 2S1_0(t_i)S2_8(t_i)$$

$$DF(T_{16}) = \sum_{i=1}^{2850} S1_0(t_i)S1_{16}(t_i) + S2_0(t_i)S2_{16}(t_i) - 2S1_0(t_i)S2_{16}(t_i)$$

$$DF(T_{32}) = \sum_{i=1}^{2850} S1_0(t_i)S1_{32}(t_i) + S2_0(t_i)S2_{32}(t_i) - 2S1_0(t_i)S2_{32}(t_i)$$

$$DF(T_{64}) = \sum_{i=1}^{2850} S1_0(t_i)S1_{64}(t_i) + S2_0(t_i)S2_{64}(t_i) - 2S1_0(t_i)S2_{64}(t_i)$$

For example, the value of each component, namely $S1_0$ $S1_m + S2_0$ $S2_m - 2$ $S1_0$ $S2_m$, is calculated following each newly stored sample and is summed over a half second of time samples, i.e., 2850 samples.

Figure 17:
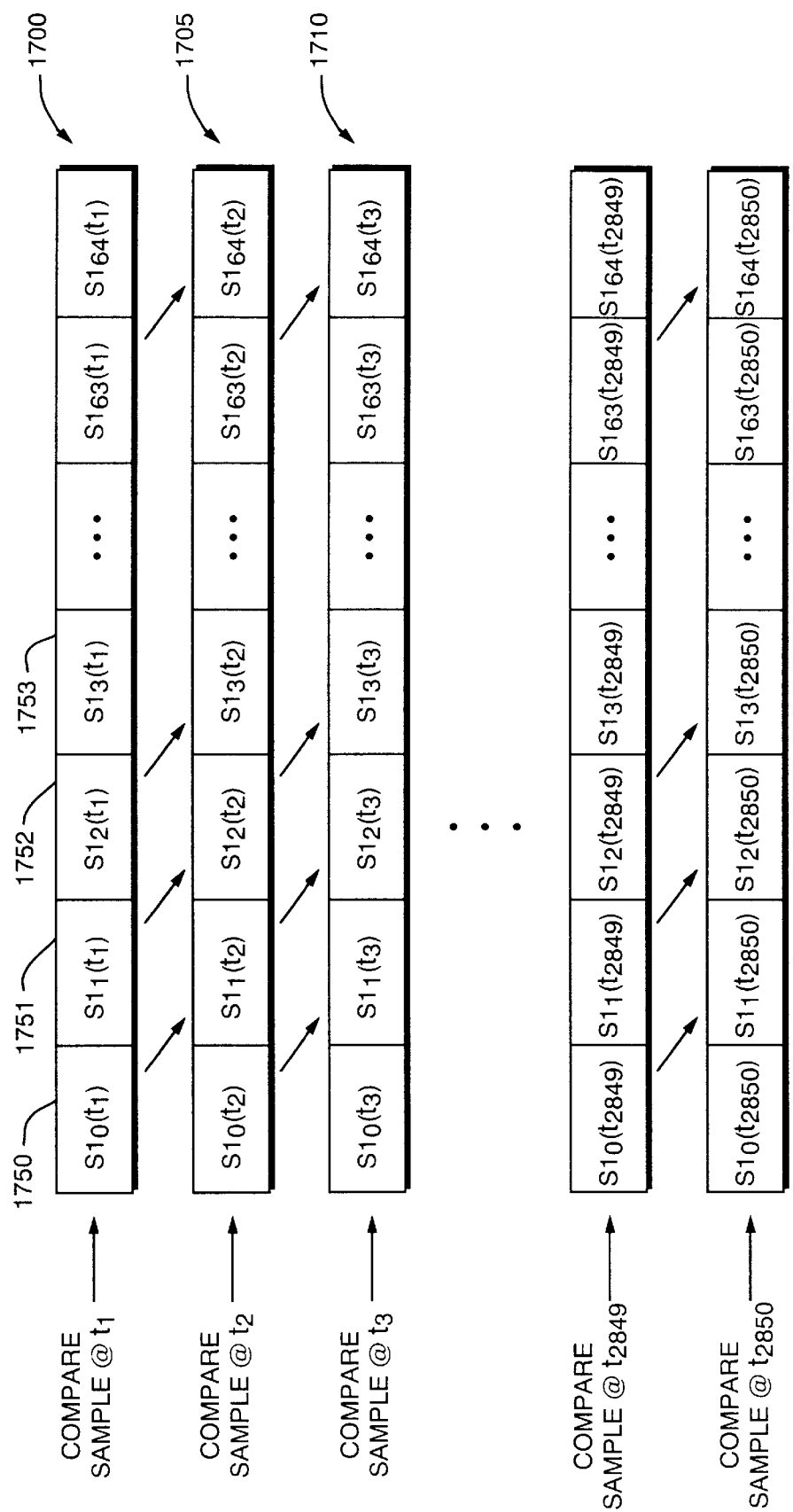
FIG. 17 is a diagram illustrating sample time images of the binary information in the shift registers and corresponding mapping to the first reflection signal equations.

FIG. 17 is a diagram illustrating a bit image of the 65 bit wide register 1700 for the first reflection signal at a given sample time. As shown, each new bit compare is shifted into the register (1700,1705,1710) from the left, wherein a cell such as 1750, 1751, 1752, and 1753 is labeled with corresponding equation mapping information. For example, $S1_0$ $(t_1)$ is the bit compare result for the first reflection signal in the first cell 1750 of the 65 bit wide shift register 1700 for sample time or snapshot at time $t_1$. The 2850 data samples in the bit images are incrementally used to generate the corresponding DF(T) values at $T_0$, $T_1$, $T_2$, $T_4$, $T_8$, $T_{16}$, $T_{32}$ and $T_{64}$ in the above equations. Notably, relatively few bits are stored in the corresponding 65 bit wide shift register at any given time.

Figure 18:
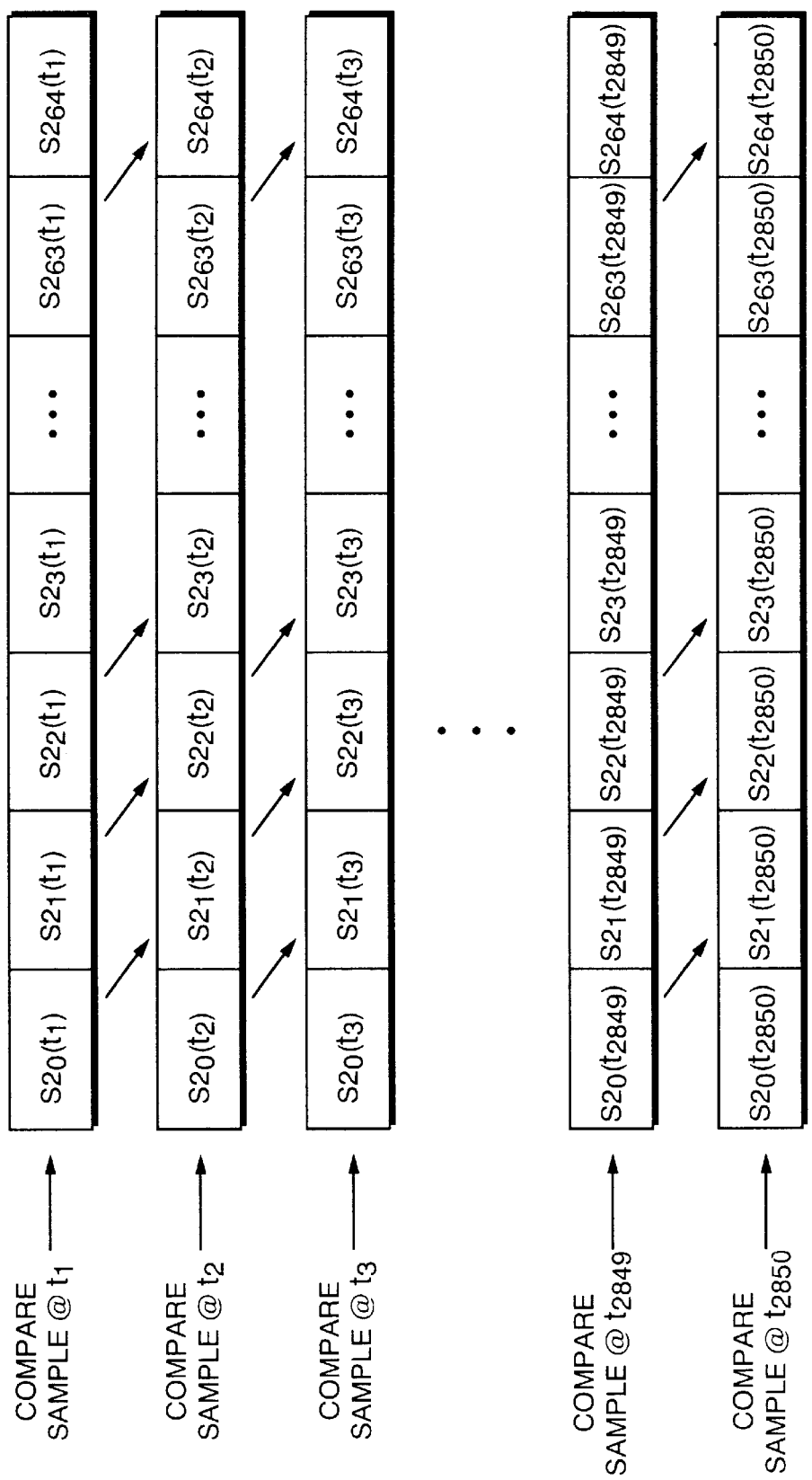
FIG. 18 is a diagram illustrating sample time images of the binary information in the shift registers and corresponding mapping to the second reflection signal equations.

Likewise, FIG. 18 is a diagram illustrating a bit sample image for the second reflection signal.

Figure 13:
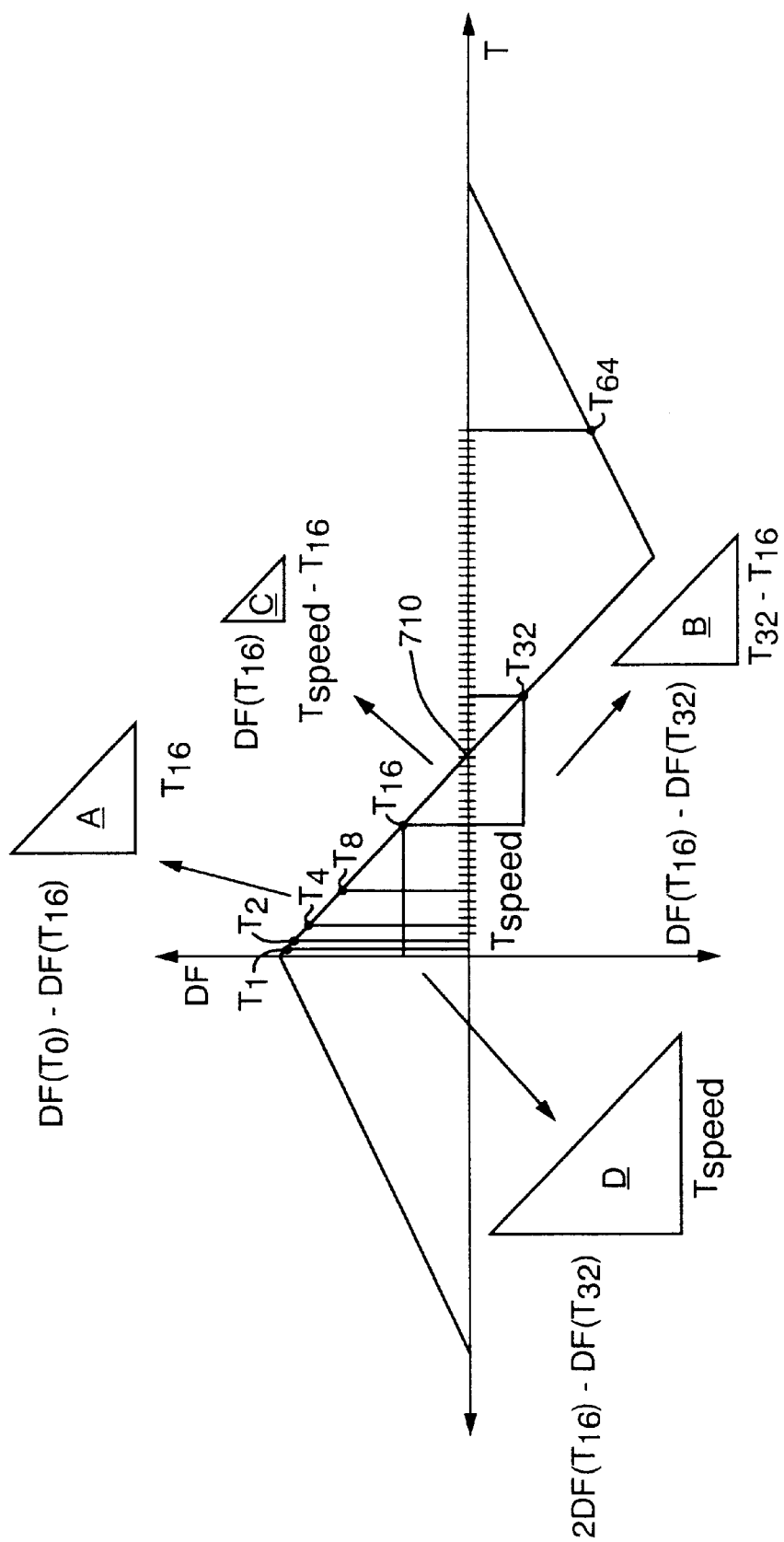
FIG. 13 is a graph illustrating a correlation function according to the principles of the present invention.

Based on the bit sample data stored in the FIFOs at a given snapshot in time, the difference correlation function is generated as illustrated in FIG. 13 using the equations in the table above.

As mentioned, the time difference correlation function is generated incrementally for each new sample of data stored in the shift register. For example, the difference function is the summation of components, i.e., $S1_0S1_m+S2_0S2_m-2S1_0S2_m$ as described in the above equations over a half second sample period. For a new ½ second sample period, $DF(T_1)$ through $DF(T_{64})$ are initially set to zero. Following each new sample stored in the shift register, results for the equations above are incrementally added to generate a final result for $DF(T_1)$ through $DF(T_{64})$.

In the equations above, S1 and S2 correspond to reflection or echo data from the first and second signal respectively, while the subscripts correspond to the tap points 525, 545 (FIG. 6) on the corresponding shift register (FIFOs) 520, 540 (FIG. 6). For example, $S1_0$ is the binary value of the zero$^{th}$ tap of the first reflection signal 1750 (FIG. 17), $S1_1$ is the binary value of the first tap of the first reflection signal 1751 (FIG. 17), and so on. Likewise, $S2_1$ is the binary value of the first tap of second reflection signal.

Each DF(T) is calculated based on standard or binary arithmetic using the binary values at the corresponding taps in the shift registers where:

$1 \times 1 = 1$ $0 \times 1 = 0$ $1 \times 0 = 0$ $0 \times 0 = 0$

It should be noted that a logical operation such as an XOR is optionally used in the above equations in lieu of multiplication.

As mentioned, after a new sample compare value is stored in the corresponding shift register, the difference function component, namely:

$S1_0S1_m+S2_0S2_m-2S1_0S2_m$ for each $DF(T_M)$ is computed and summed with the last value for a given $T_M$, where M=logarithmic tap point 0,1,2,4,8, ... 64. Based on the summation of these components for each sample compare over a half second sample range, each logarithmically spaced DF(T) is incrementally generated. The resulting values for $DF(T_1)$, $DF(T_2)$, $DF(T_4)$, $DF(T_8)$, $DF(T_{16})$, $DF(T_{32})$ and $DF(T_{64})$ comprise a time difference correlation function.

The time difference correlation function as shown in FIG. 13 includes a zero-crossing point on the T-axis (horizontal axis), which mathematically corresponds with the time difference between the first and second reflection signal. Based on the delay time between the first and second reflection signal, vessel speed is calculated. The zero-crossing point is estimated using either interpolation or extrapolation among data points on the difference correlation function, i.e., DF(T) values at $T_0, T_1, T_2, T_4, T_8, T_{16}, T_{32}$ and $T_{64}$. An example of the zero-crossing point is shown in FIG. 13 at reference number 710.

According to the principles of the present invention, the amount of data manipulation or number-crunching is substantially reduced because essentially only 7 points are used to create the difference correlation function, i.e., the following points define the difference correlation function at $DF(T_1)$, $DF(T_2)$, $DF(T_4)$, $DF(T_8)$, $DF(T_{16})$, $DF(T_{32})$ and $DF(T_{64})$. A precise at is determined from the difference function by calculating the zero-crossing point as shown at 710 or $T_{SPEED}$. Since the function is approximately linear, interpolation or extrapolation techniques based on linear mathematics are used to determine $T_{SPEED}$. Accordingly, a vessel speed is calculated by:

$$\text{Speed} = \text{ping rate} \frac{\text{element spacing}}{2 \times T_{SPEED}}$$

This equation is derived from proportional triangles A, B, C, and D as illustrated in FIG. 13.

Based on this equation, $T_{SPEED}$ at point 710 is calculated. Known dimensions of triangle B are substituted into unknown triangle A. Based on the geometries, it can be shown that:

$$\frac{DF(T_{16}) - DF(T_{32})}{2DF(T_{16}) - DF(T_{32})} = \frac{T_{16}}{Tspeed} = \frac{\frac{16}{\text{ping rate}}}{\frac{\text{element spacing}}{2 \times \text{speed}}}$$

In the instant case, vessel speed for a $T_{SPEED}$ zero-crossing point 710 between $T_{16}$ and $T_{32}$ is:

$$\text{speed} = \frac{\text{ping rate} \frac{\text{sensor element spacing}}{2}}{16} \times \left(\frac{DF(T_{16}) - DF(T_{32})}{2DF(T_{16}) - DF(T_{32})}\right)$$

The following equations are used to calculate vessel speed based upon where the zero crossing 710 lies on the difference correlation function:

| SPEED RANGE | SPEED EQUATION |
|---|---|
| $T_1 - T_2$ | $\frac{\text{ping rate} \frac{\text{elementspacing}}{2}}{1} \cdot \frac{DF(T_1) - DF(T_2)}{2DF(T_1) - DF(T_2)} = \text{speed}$ |
| $T_2 - T_4$ | $\frac{\text{ping rate} \frac{\text{elementspacing}}{2}}{2} \cdot \frac{DF(T_2) - DF(T_4)}{2DF(T_2) - DF(T_4)} = \text{speed}$ |
| $T_4 - T_8$ | $\frac{\text{ping rate} \frac{\text{elementspacing}}{2}}{4} \cdot \frac{DF(T_4) - DF(T_8)}{2DF(T_4) - DF(T_8)} = \text{speed}$ |
| $T_8 - T_{16}$ | $\frac{\text{ping rate} \frac{\text{elementspacing}}{2}}{8} \cdot \frac{DF(T_8) - DF(T_{16})}{2DF(T_8) - DF(T_{16})} = \text{speed}$ |
| $T_{16} - T_{32}$ | $\frac{\text{ping rate} \frac{\text{elementspacing}}{2}}{16} \cdot \frac{DF(T_{16}) - DF(T_{32})}{2DF(T_{16}) - DF(T_{32})} = \text{speed}$ |
| $T_{32} - T_{64}$ | $\frac{\text{ping rate} \frac{\text{elementspacing}}{2}}{32} \cdot \frac{DF(T_{32}) - DF(T_{64})}{2DF(T_{32}) - DF(T_{64})} = \text{speed}$ |

For example, if the zero crossing lies between $T_8$ and $T_{16}$, the corresponding speed equation is employed to determine the time difference between signals. These equations are derived from the mathematical methods as described in FIG. 13.

FIGS. 14a through 14f illustrate a method of determining vessel speed based upon the difference correlation function. The routine repeats on a continuous basis, constantly generating a vessel speed based on the first and second reflection signal.

In step 905, a value is computed for $DF(T_1)-DF(T_2)$. A range check is then performed for both $DF(T_1)$ and $DF(T_1)-DF(T_2)$ in step 910. If the values fall within the appropriate range indicating reasonable data, then the routine continues at step 920. If the value of $DF(T_1)$ or $DF(T_1)-DF(T_2)$ falls outside a predetermined range, no speed is found and the last speed is held-over for 2 seconds in step 912.

The difference function at $T_0$ is then calculated in step 920 based on $2DF(T_1)-DF(T_2)$. If the result of calculated $DF(T_0)$ in step 920 does not fall within an appropriate predetermined range in step 925, the routine continues at step 955 for the next speed range check, i.e., $T_2T_4$ Speed Range in FIG. 14b. Otherwise, speed is calculated based on equations in steps 930, 935 and 940. The value of "57Kt" in step 930 is based on the ping rate and transducer or receiver element spacing. For example, $57Kt/1=[ping\ rate\ X\ (element\ spacing/2)]/1$ is the first component of the speed equation for range $T_1T_2$ as shown in the Speed Range/Speed Equation table above. In a preferred embodiment, the ping rate is set to 5.7 KHz and the element spacing is 0.405 inches. A conversion factor of 0.049 is used to convert from inches/second to nautical miles/hour, i.e., knots.

Figure 14A:
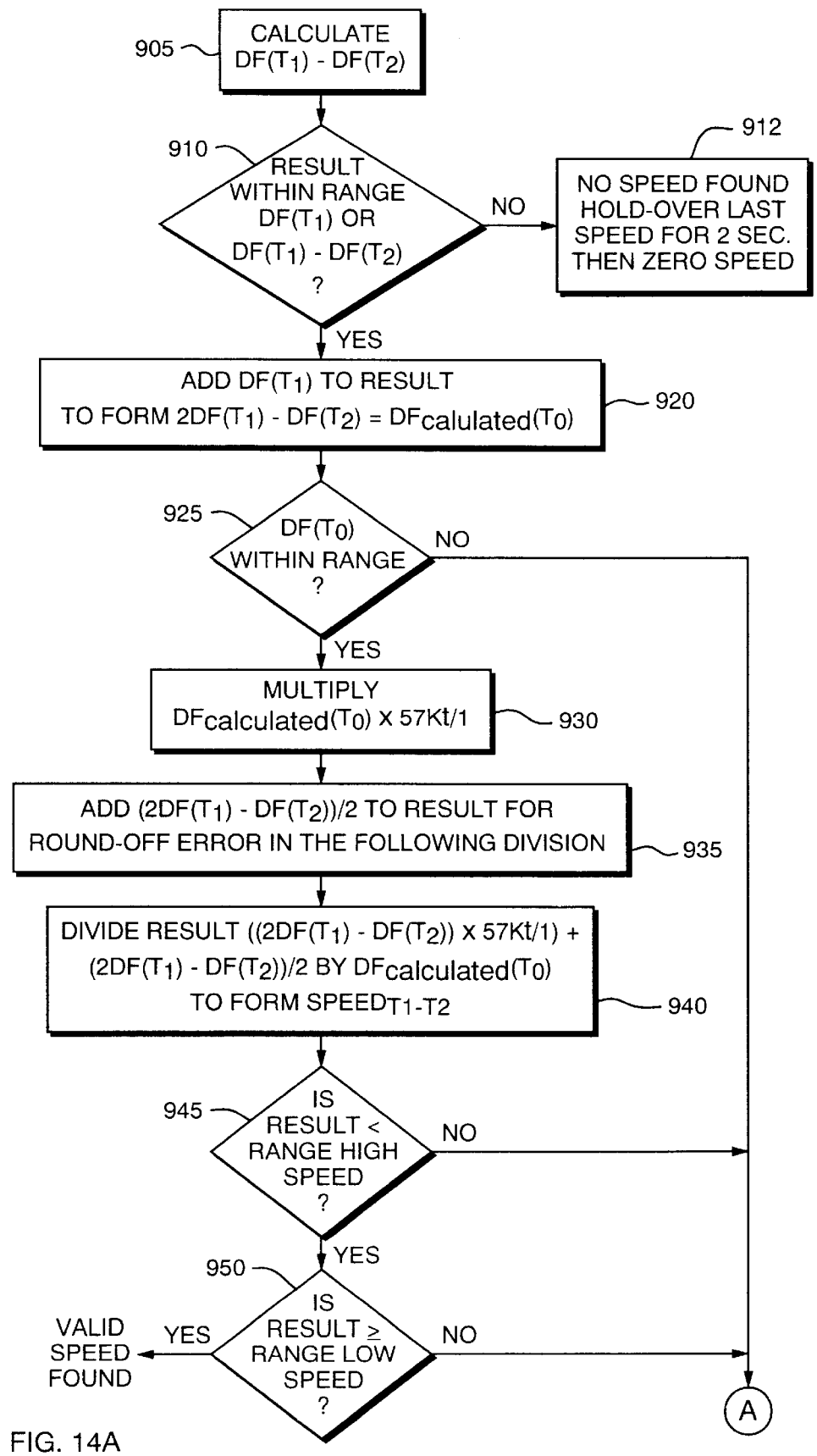
FIGS. 14a–f is a flow diagram of a method for calculating speed based upon a zero-crossing of the correlation function.
Figure 14B:
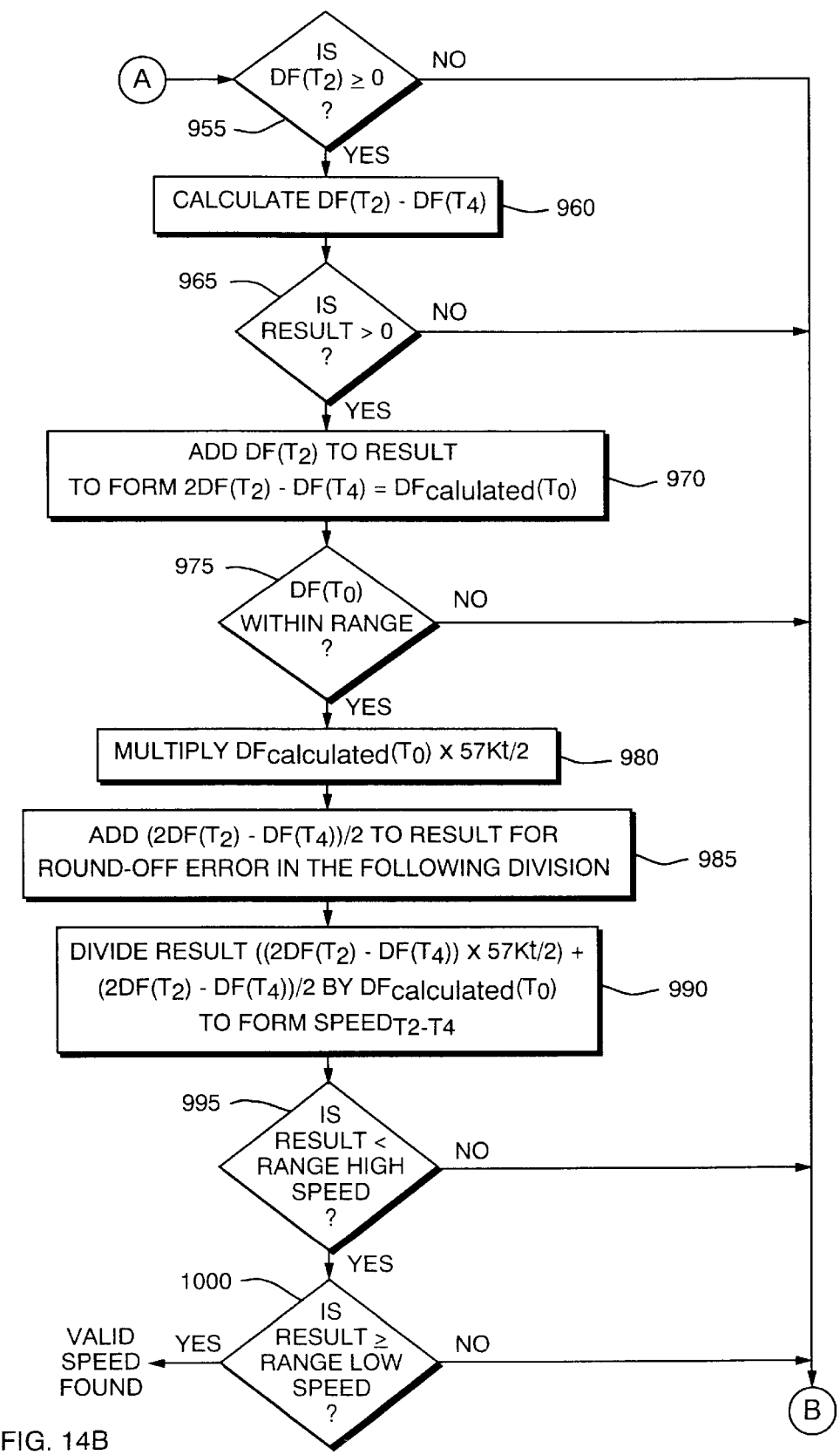

The calculated speed is then compared in step 945 and 950 to determine whether the calculated speed falls within a high speed or low speed value for the range $T_1$ and $T_2$. If so, a valid speed has been found. If the speed result does not fall within range, the speed range $T_2$ to $T_4$ is checked in step 955 (FIG. 14b).

In step 955 (FIG. 14b), it is determined whether the difference function is greater than zero at time $T_2$. If not, the next lower speed range in FIG. 14c is checked beginning in step 1005.

If the difference function is greater than zero at time $T_2$ in step 955, $DF(T_2)-DF(T_4)$ is calculated in step 960. If the result of $DF(T_2)-DF(T_4)$ is less than zero in step 965, the next lower speed range is checked beginning in step 1005 (FIG. 14c). Otherwise the difference function at is calculated based on $2DF(T_2)-DF(T_4)$ in step 970.

Figure 14C:
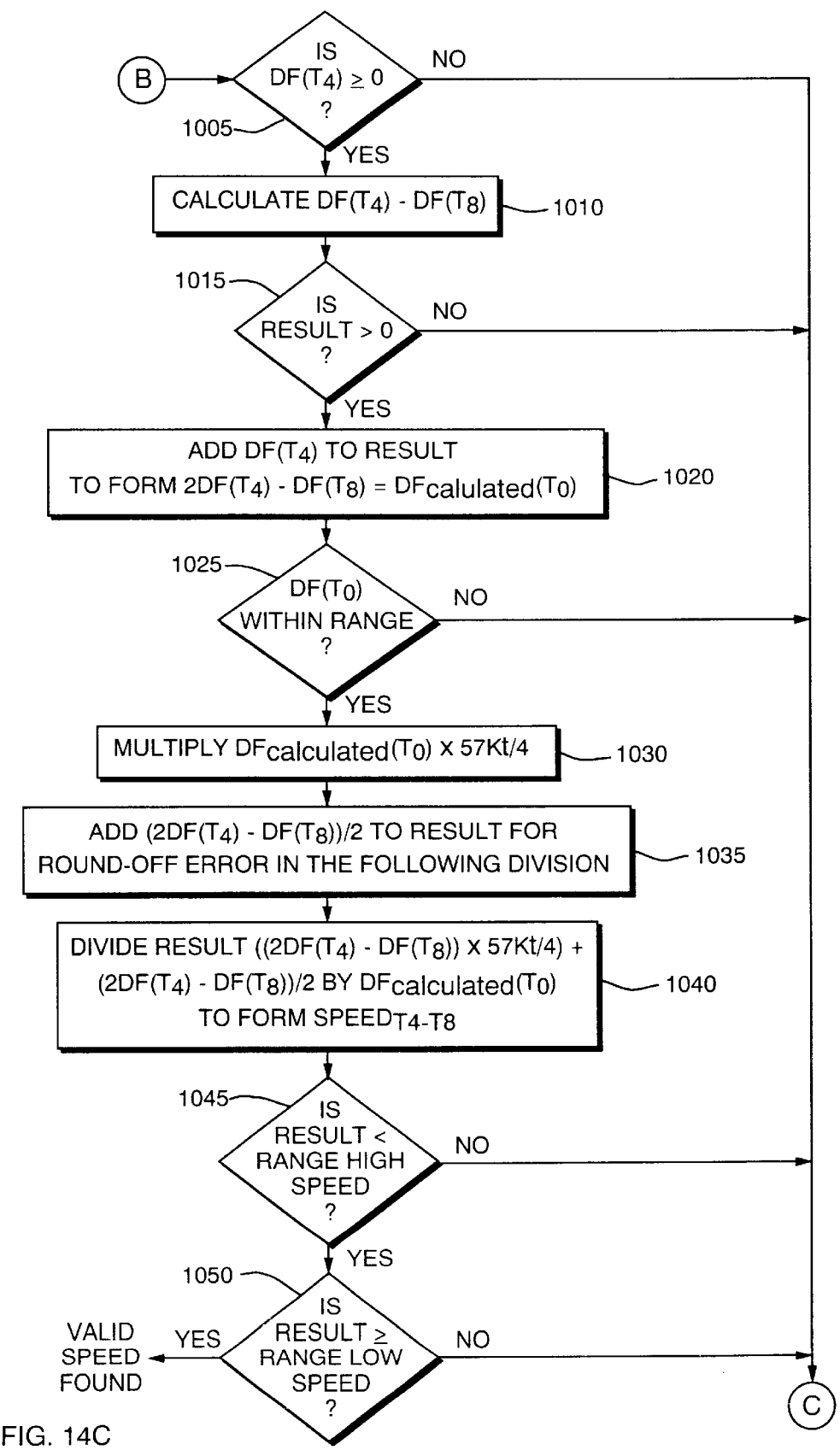
Figure 14D:
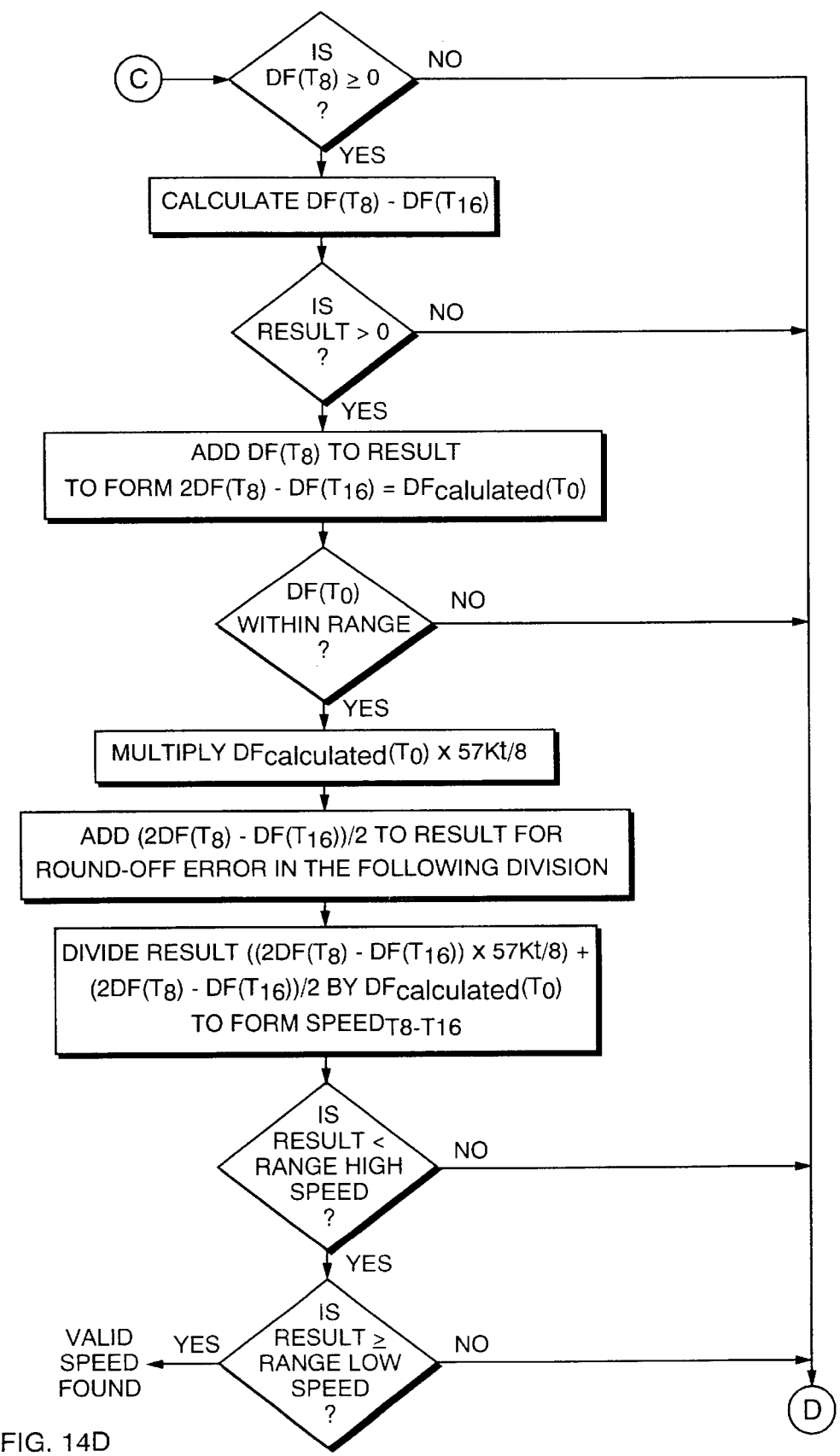
Figure 14E:
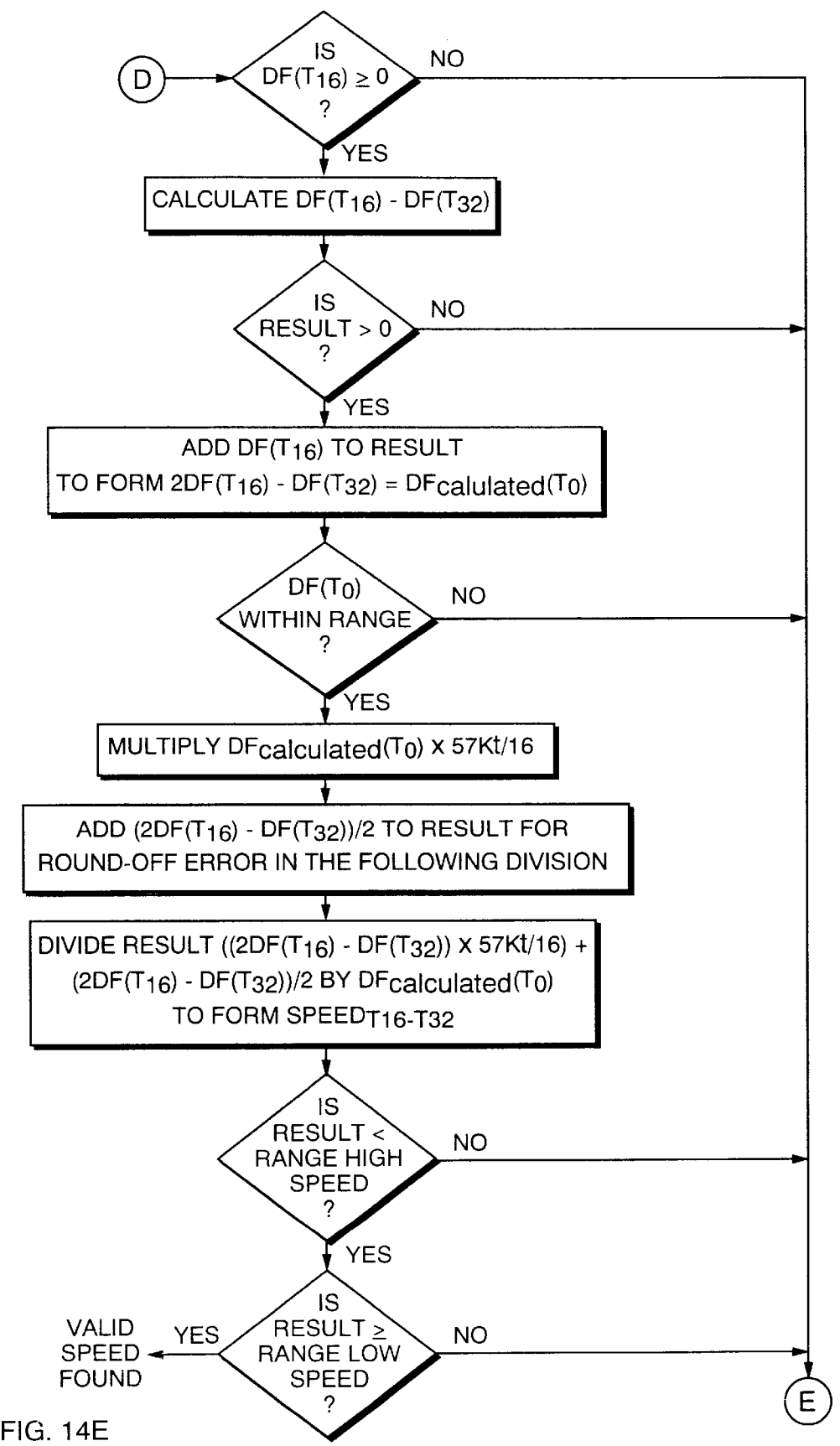
Figure 14F:
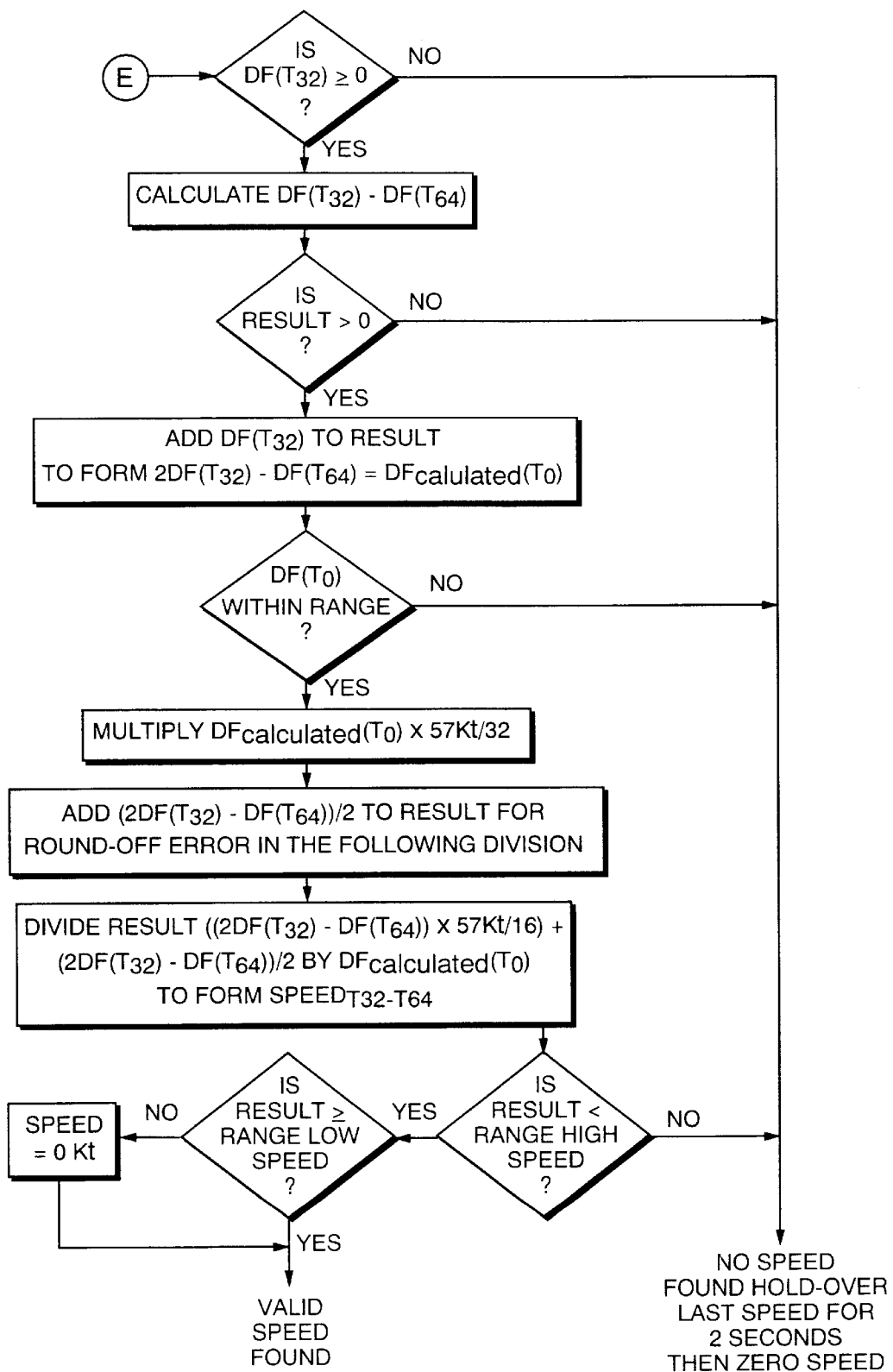

If the result of calculated $DF(T_0)$ in step 970 is not within a predetermined range in step 975, the next lower speed range is checked beginning at step 1005 (FIG. 14c). If the result in step 970 is within an appropriate range in step 975, then speed is calculated based on equations in step 980, 985 and 990.

If the result of calculated $DF(T_0)$ in step 970 is not within a predetermined range in step 975, the next lower speed range is checked beginning at step 1005 (FIG. 14c). If the result in step 970 is within an appropriate range in step 975, then speed is calculated based on equations in step 980, 985 and 990.

The calculated speed is then checked against the speed range in step 995 and step 1000 to determine if the result is within an appropriate range. If so, a valid speed has been found. Otherwise, a next lower speed range is checked beginning in step 1005.

As shown in FIG. 14c, steps 1005, 1010, 1015, 1020, 1025, 1030, 1035, 1040, 1045, and 1050 are similar to steps 955, 960, 965, 970, 975, 980, 985, 990, 995 and 1000 respectively, as explained with reference to FIG. 14b.

The aforementioned process of determining speed continues in each of the ranges until a valid speed has been found.

Figure 15:
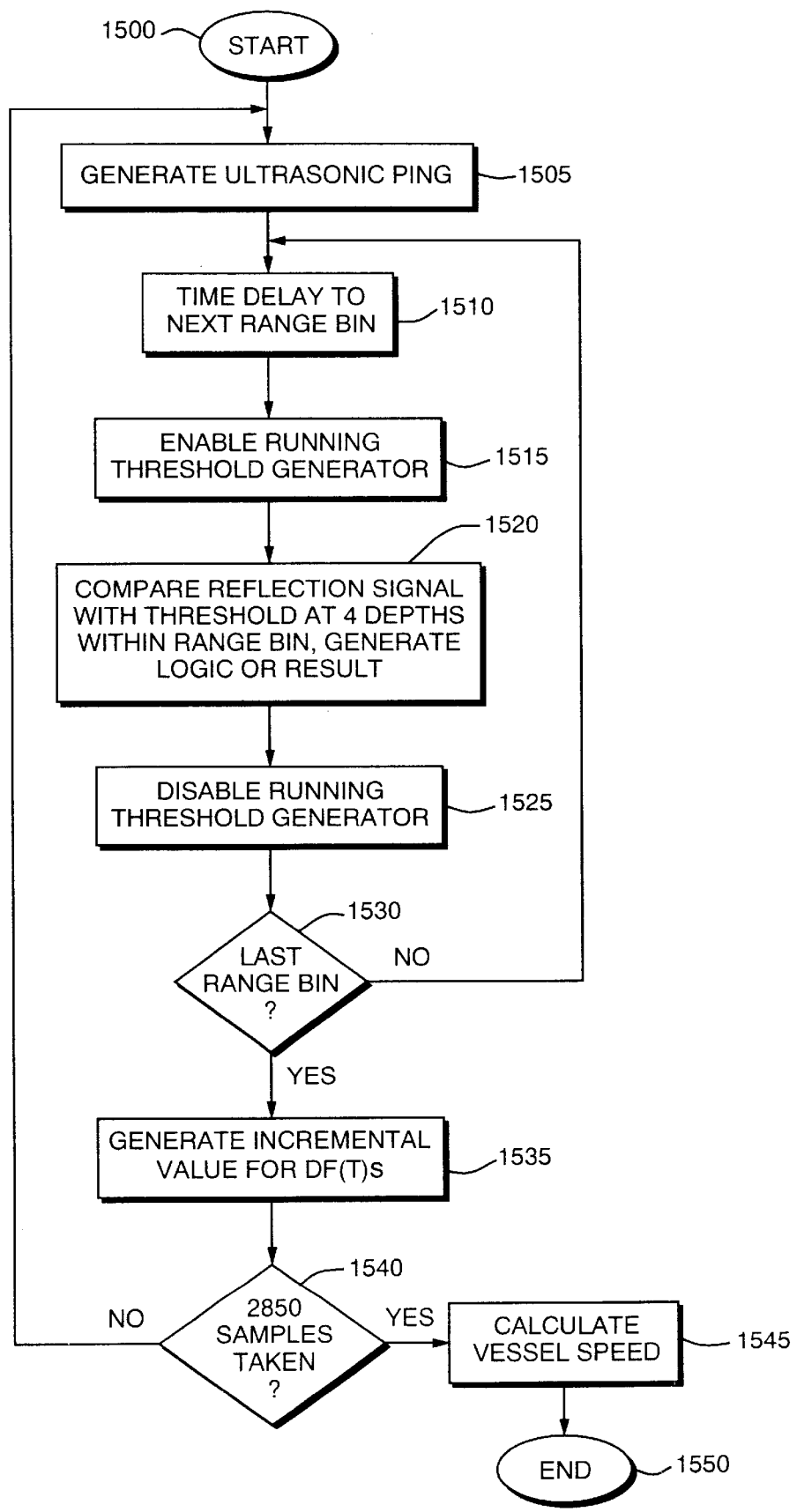
FIG. 15 is a flow chart illustrating the process associated with generating a vessel speed of the present invention.

FIG. 15 is a flow chart illustrating the process associated with generating a vessel speed. Step 1500 shows the entry point of the flow process. An ultrasonic ping is first generated in step 1505. As mentioned, a time delay is incorporated before sampling a particular range bin in step 1510 to allow time for the ultrasonic signal to travel through the medium and bounce back to the receiver. In step 515, the running threshold signal for the range bin is activated so that the running threshold signal tracks the value of the reflection signal preferably during a range bin only.

In step 1520, four samples within a range bin are compared to the running threshold signal, where a logic 1 is noted if the running threshold is less than the intensity of the reflection signal at a sample point. If any of the four samples of the reflection signal within a range bin is greater than the running threshold, a logic 1 is stored as compare result data for the range bin and a particular ping. This compare result data is then stored in appropriate shift register.

The running threshold generator is then disabled in step 1525 after sampling of the range bin.

Step 1530 provides a flow back to step 1510 if all range bins have not been sampled following an ultrasonic ping. After all range bins have been sampled in step 1530, the incremental value for each DF(T) is calculated in step 1535. Thereafter, the aforementioned routine repeats following step 1540 to perform 2850 successive samples for each range bin. After the appropriate number of samples is taken in step 1540, vessel speed is calculated based on the generated values for the DF(T)s in step 1545. Step 1550 shows the end of the flow process.

It should be noted that there is preferably a pair of shift registers for each monitored range bin, and that a set of DF(T)s are generated based on sample compare data in each corresponding pair of shift registers. Thereafter, a vessel speed is generated based on averaging the calculated speed for each range bin.

Alternatively, a single set of DF(T)s are optionally generated based on the compare sample data in multiple range bins.

Figure 16:
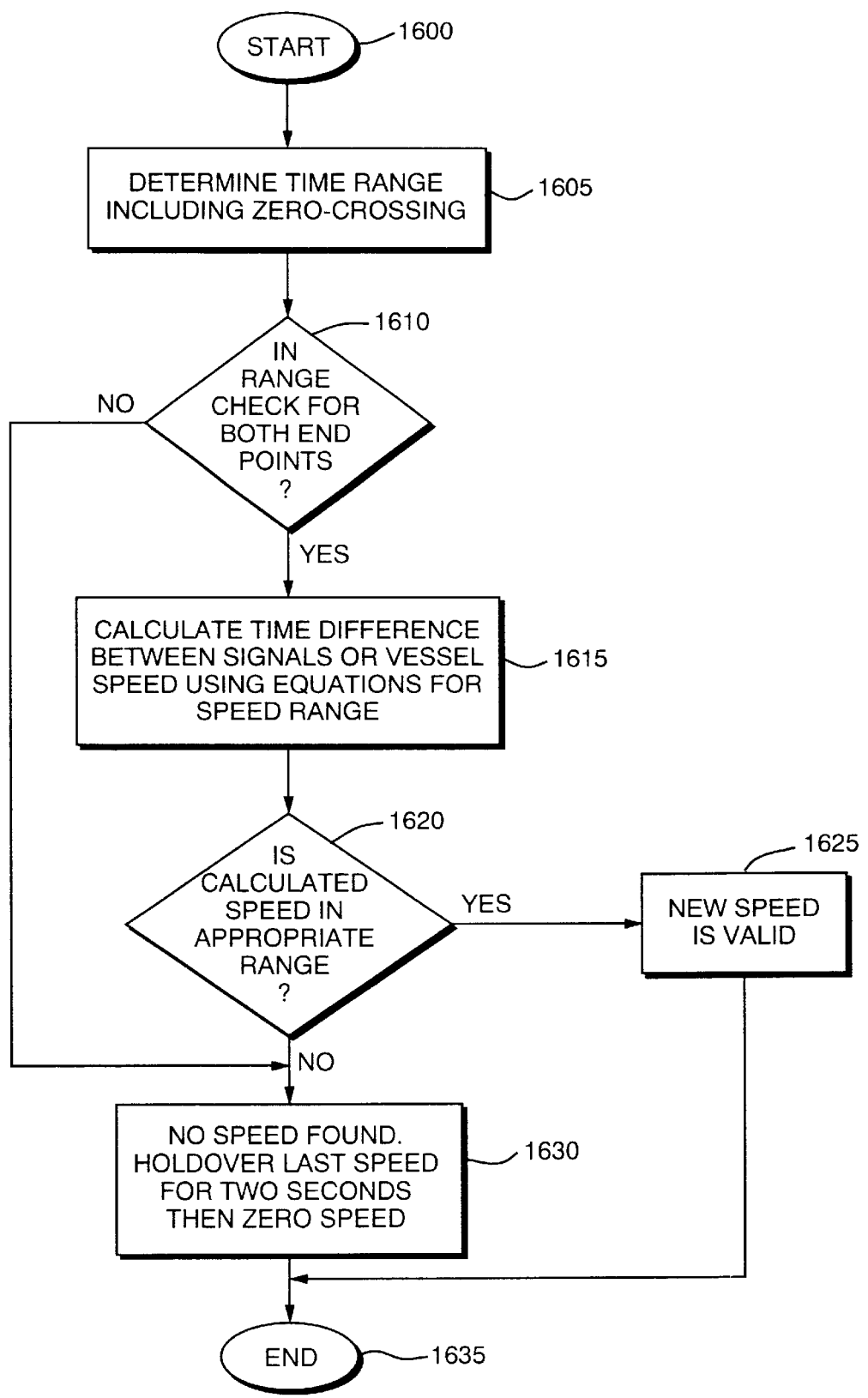
FIG. 16 is a flow chart illustrating details of how the correlation function is used to calculate vessel speed of the present invention.

FIG. 16 is a flow chart illustrating details of how the correlation function is used to calculate vessel speed. Step 1600 shows the start of the flow process.

In step 1605, the range of points including the zero-crossing is first determined. For example, if $T_4$ corresponds with the DF(T) point on the left and above the zero-crossing while $T_8$ corresponds with the DF(T) on the right and below the zero-crossing, the speed range is $T_4T_8$.

In step 1610, a range check is performed on the value of DF(T) at the corresponding range endpoints, i.e., such as $T_4$ and $T_8$, to determine if the data for DF(T) is within a predetermined range. If the values for a given DF(T) fall outside a corresponding predetermined range, no speed is found and the last calculated speed is held-over for two seconds. In other words, if it is known that the data is bad based on a range check, the data is not used to determine vessel speed.

If the value for the DF(T)s at the range endpoints is within the appropriate range in step 1610, a vessel speed is calculated in step 1615 using the appropriate speed equation for the speed range. Thereafter, a range check is performed on the calculated vessel speed. If the vessel speed is within range, a new vessel speed is recorded in step 1625. Alternatively, if the calculated vessel speed is not within the predetermined range in step 1620, no speed is found and the last speed is held over for two seconds in step 1630. Step 1635 shows the end of the flow process.

The routines as described in FIGS. 15 and 16 are repeated on a continuous basis such that a new vessel speed is generated every ½ second based on the previous two seconds of sampled data. For example, the last four ½ second intervals of sample data used to generate a corresponding vessel speed are averaged to generate a vessel speed for the past 2 second time frame.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method comprising:

receiving a first signal;

receiving a second signal whose time-varying magnitude approximates that of the first signal but is shifted in time; and comparing the first and second signals with respective first and second thresholds to generate a discrete mathematical function that is used to determine a time difference between the first and second signals.

2. A method as in claim 1 further comprising:

interpolating a time difference between the first and second signals based on a zero-crossing of the discrete mathematical function.

3. A method as in claim 1, wherein a magnitude of the first signal is proportional to an intensity of reflections in a first monitored region and a magnitude of the second signal is proportional to an intensity of reflections in a second monitored region.

4. A method as in claim 3, wherein the discrete mathematical function is used to determine a relative speed of fluid with respect to sensors monitoring the first and second regions, the sensors respectively generating the first and second received signals.

5. A method as in claim 1, wherein the respective first and second thresholds are generated based on corresponding running averages of the first and second signals.

6. A method as in claim 1, wherein the discrete mathematical function is generated at discrete logarithmically spaced sample times.

7. A method as in claim 1, wherein the discrete mathematical function is a difference function.

8. A method as in claim 3, wherein the mathematical function is used to determine a relative speed of guided fluid with respect to a sensor based on reflections in the first and second monitored regions.

9. A method as in claim 3, wherein ultrasonic sensors are used to generate pings and monitor reflections in the first and second regions.

10. A method as in claim 1, wherein the discrete mathematical function is incrementally generated based on a shift register of stored compare results.

11. A method comprising:

receiving a first signal;

receiving a second signal whose time-varying magnitude approximates that of the first signal but is shifted in time;

storing sample data related to the first and second signals in memory; and incrementally generating discrete points of a mathematical function based on a comparison of present sample data of the first and second signals and previous sample data related to the first and second signals stored in memory.

12. A method as in claim 11 further comprising:

comparing the first and second signals with respective first and second thresholds to generate the sample data that is stored in memory.

13. A method as in claim 12, wherein the respective first and second thresholds are corresponding running averages of the first and second received signals.

14. A method as in claim 12, wherein the sample data stored in memory is a single bit indicating whether the respective first or second received signal at a sample time is greater than or less than a respective first or second threshold.

15. A method as in claim 11, wherein the mathematical function is incrementally generated based on a summation of sample components over multiple sample periods.

16. A method as in claim 15, wherein the sample components are based on an auto-correlation function of the first signal plus an auto-correlation function of the second signal minus twice the cross-correlation function of the first and second signals.

17. A method as in claim 16, wherein each sample component is equal to $S1_0\ S1_m + S2_0\ S2_m - 2\ S1_0\ S2_m$.

18. A method as in claim 11 further comprising:

interpolating a time difference between the first and second signals based on discrete sample points of the mathematical function.

19. An apparatus comprising:

a first receiver circuit to receive a first signal;

a second receiver circuit to receive a second signal whose time-varying magnitude, at least for a duration, approximates that of the first signal but is shifted in time;

a compare circuit that compares the first and second signals with respective first and second thresholds to generate a discrete mathematical function which is used to determine a time difference between the first and second signals.

20. An apparatus comprising:

a first receiver to receive a first signal;

a second receiver to receive a second signal whose time-varying magnitude approximates that of the first signal but is shifted in time;

a storage device to store sample data related to the first and second signals in memory; and a processor circuit that incrementally generates discrete points of a mathematical function based on a comparison of present sample data of the first and second signals and previous sample data of the first and second signals stored in memory.

21. A method of measuring a time difference between two ultrasonic signals, the method comprising:

receiving a first echo signal that is proportional to an intensity of reflections in a first monitored region;

receiving a second echo signal that is proportional to an intensity of reflections in a second monitored region, the second echo signal having a time-varying magnitude approximating that of the first echo signal but shifted in time; and comparing the first and second echo signals with respective first and second thresholds to generate a discrete mathematical function that is used to determine a time difference between the first and second signals.

22. A method as in claim 21, wherein the first and second echo signals are produced as a result of reflections of ultrasonic signals generated by one or more ultrasonic transducers.

23. A method as in claim 21 further comprising:
interpolating a time difference between the first and second echo signals based on a crossing of the discrete mathematical function on a reference axis.

24. A method as in claim 21, wherein rectangularly shaped ultrasonic transducers are used to receive the first and second echo signal.

25. A method as in claim 24, wherein the discrete mathematical function is used to determine a relative speed of fluid with respect to sensors monitoring the first and second regions, the sensors respectively generating the first and second received echo signals.

26. A method as in claim 21, wherein the respective first and second thresholds are generated based on corresponding running averages of the first and second echo signals.

27. A method as in claim 26, the respective first and second thresholds each include an offset.

28. A method as in claim 21, wherein the discrete mathematical function is use dto determine a relative speed of fluid.

29. A method as in claim 24, wherein the mathematical function is used to determine a relative speed of guided fluid with respect to a sensor based on ultrasonic reflections in the first and second monitored regions.

30. A method as in claim 24, wherein ultrasonic sensors are used to generate pings and monitor reflections in the first and second regions.

31. A method as in claim 21, wherein the discrete mathematical function is incrementally generated based on a shift register of stored compare results.

32. A method comprising:
receiving a first signal that is generated based on ultrasonic reflections in a liquid;
receiving a second signal whose time-varying magnitude approximates that of the first signal but is shifted in time, the second signal being generated based on ultrasonic reflections in the liquid;
storing sample data related to the first and second signals in memory; and
incrementally generating discrete points of a mathematical function based on a comparison of present sample data of the first and second signals and previous sample data related to the first and second signals stored in memory.

33. A method as in claim 32 further comprising:
comparing the first and second signals with respective first and second thresholds to generate the sample data that is stored in memory.

34. A method as in claim 33, wherein the ultrasonic reflections are caused by particles in water.

35. A method as in claim 33, wherein the sample data stored in memory is a single bit indicating whether the respective first or second received signal at a sample time is greater than or less than a respective first or second threshold.

36. A method as in claim 32, wherein the mathematical function is incrementally generated based on summing compared sample data taken over multiple sample periods.

37. A method as in claim 36, wherein the sample components are based on an auto-correlation function of the first signal plus an auto-correlation function of the second signal minus twice the cross-correlation function of the first and second signals.

38. A method as in claim 32 further comprising:
interpolating a time difference between the first and second signals based on discrete sample points of the mathematical function.

* * * * *